United States Patent [19]
Jennings et al.

[11] Patent Number: 5,825,003
[45] Date of Patent: Oct. 20, 1998

[54] CUSTOMER-DIRECTED, AUTOMATED PROCESS FOR TRANSFERRING FUNDS BETWEEN ACCOUNTS USING A HOLDING ACCOUNT AND LOCAL PROCESSING

[75] Inventors: Horton Jennings, Chicago; Nigel Pinnell, Highland Park, both of Ill.; Khanh Do, Rancho Palos Verdes, Calif.; Virendrakumar Shah, La Palma, Calif.; Marjorie Profumo, Santa Monica, Calif.; John Downing, Old Windsor, England; Neil Goodhand, Bracknell, England; Marion Maino, Southold; Michael H. Thompson, Centereach, both of N.Y.

[73] Assignee: Citicorp Development Center, Los Angeles, Calif.

[21] Appl. No.: 795,355

[22] Filed: Feb. 4, 1997

Related U.S. Application Data

[63] Continuation-in-part of Ser. No. 505,886, Jul. 24, 1995, Pat. No. 5,659,165.
[51] Int. Cl.[6] ........................................... G06F 17/60
[52] U.S. Cl. .............................. 235/379; 235/381; 902/5; 902/32
[58] Field of Search ..................... 235/379, 375, 235/382, 380, 381; 902/4, 5, 14, 20, 24, 32; 395/200.01, 200.02, 200.03, 200.1; 705/42, 44

[56] References Cited

U.S. PATENT DOCUMENTS

| | | | |
|---|---|---|---|
| 3,826,344 | 7/1974 | Wahlberg | 235/381 X |
| 4,341,951 | 7/1982 | Benton | 235/379 |
| 4,498,000 | 2/1985 | Decavele et al. | 235/380 |
| 4,529,870 | 7/1985 | Chaum | 235/380 |
| 4,707,592 | 11/1987 | Ware | 235/379 |
| 4,766,293 | 8/1988 | Boston | 235/379 |
| 4,773,001 | 9/1988 | Blair et al. | 364/200 |
| 4,926,368 | 5/1990 | Morita et al. | 364/408 X |
| 5,012,076 | 4/1991 | Yoshida | 235/379 |
| 5,025,373 | 6/1991 | Keyser, Jr. et al. | 235/379 X |
| 5,326,960 | 7/1994 | Tannenbaum | 235/379 |
| 5,350,906 | 9/1994 | Brody et al. | 235/379 |
| 5,367,561 | 11/1994 | Adler et al. | 235/379 |
| 5,424,938 | 6/1995 | Wagner et al. | 364/408 |
| 5,440,634 | 8/1995 | Jones et al. | 300/24 |
| 5,448,043 | 9/1995 | Nakano et al. | 235/379 |
| 5,455,407 | 10/1995 | Rosen | 235/380 |
| 5,457,305 | 10/1995 | Akel et al. | 235/379 |
| 5,524,073 | 6/1996 | Stambler | 380/24 |

*Primary Examiner*—Donald T. Hajec
*Assistant Examiner*—Michael G. Lee
*Attorney, Agent, or Firm*—George T. Marcou; Kilpatrick Stockton LLP

[57] ABSTRACT

A system and method for allowing funds to be transferred instantly to an account so that the funds are available to the beneficiary at the time they are sent, based on customer information which can be automatically accessed by the system, rather than needing to be manually entered. Further, the system automatically computes the appropriate exchange rate and any fees to be charged to the account and displays them to the user so that the user may authorize or cancel the transaction. They system also analyzes the parameters of the transfer to assure that the transfer conforms with pertinent government regulations. The system also enables the user to quantify the amount to be transferred in the currency of the originating account or the currency of the receiving account, thereby maximizing the flexibility of the system. The system further is designed so that it can be understood and accessed by individuals having no special expertise in computers, wire transfers and the like. Further, the system is provided with various safeguards to assure that only authorized individuals have access to the accounts and the funds and immediately verifies successful completion or failure to the customer.

20 Claims, 18 Drawing Sheets

FIG. 2

| | USER | TERMINAL | LOCAL FEP | NETWORK SWITCH | REMOTE FEP |
|---|---|---|---|---|---|
| 1. | ▨ | ▨ | | | |
| 2. | | ▨ | ▨ | | |
| 3. | ▨ | ▨ | | | |
| 4. | | ▨ | ▨ | | |
| 5. | | | ▨ | ▨ | |
| 6. | | | | ▨ | ▨ |
| 7. | | | ▨ | ▨ | |
| 8. | | ▨ | ▨ | | |
| 9. | ▨ | ▨ | | | |
| 10. | | ▨ | ▨ | | |
| 11. | | | ▨ | ▨ | |
| 12. | | ▨ | ▨ | | |
| 13. | ▨ | ▨ | | | |
| 14. | | ▨ | ▨ | | |
| 15. | | | ▨ | ▨ | |
| 16. | | | | ▨ | ▨ |
| 17. | | | ▨ | ▨ | |
| 18. | | ▨ | ▨ | | |
| 19. | ▨ | ▨ | | | |

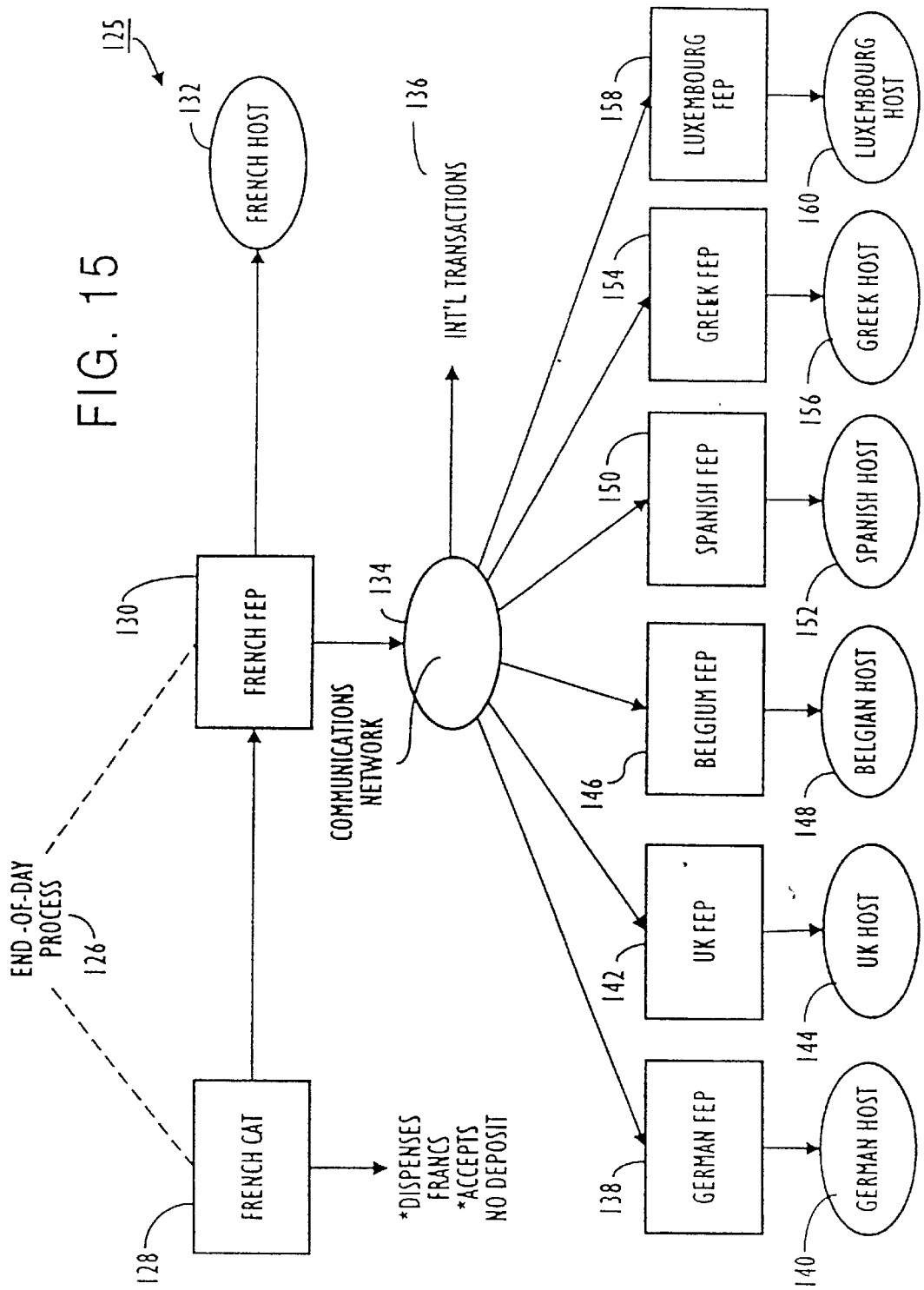

CUSTOMER-DIRECTED, AUTOMATED PROCESS FOR TRANSFERRING FUNDS BETWEEN ACCOUNTS USING A HOLDING ACCOUNT AND LOCAL PROCESSING

CROSS-REFERENCE TO RELATED APPLICATIONS

This application is a continuation-in-part to co-pending application entitled "A CUSTOMER-DIRECTED, AUTOMATED PROCESS FOR TRANSFERRING FUNDS BETWEEN ACCOUNTS VIA A COMMUNICATIONS NETWORK," Ser. No. 08/505,886, filed Jul. 24, 1995, now U.S. Pat. No. 5,659,165.

NOTICE OF COPYRIGHTED MATERIAL IN DISCLOSURE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Reference is also made to co-pending application entitled "INTEGRATED FULL SERVICE CONSUMER BANKING SYSTEM AND SYSTEM AND METHOD FOR PENDING AN ACCOUNT," Ser. No. 08/473,975, filed Jun. 7, 1995 (Attorney Docket No. 107045.003) and co-pending application entitled "METHOD AND SYSTEM FOR PROVIDING INTEGRATED BROKERAGE AND OTHER FINANCIAL SERVICES THROUGH CUSTOMER ACTIVATED TERMINALS," Ser. No. 08/483,710, filed Jun. 7, 1995 (Attorney Docket No. 107045.004), the disclosures of which are incorporated by reference herein.

FIELD OF THE INVENTION

This invention relates to a system and process for performing money transfers between financial institutions for credit to general ledger or customer accounts, or electronic transfers. More particularly, the present invention relates to a system and method for performing such transactions in a secure manner and substantially in real time.

BACKGROUND OF THE INVENTION

In today's shrinking world, an increasingly common problem involves moving funds between countries or between bank accounts. An existing process requires one to contact a financial institution and request a wire-transfer of funds to another institution. This process is lengthy, often taking from several days up to two weeks to accomplish. Further, requested transfers often may not go through as expected or intended. Even when requested transfers do go through, it sometimes occurs that funds are not handled properly by the institution receiving the funds.

In particular, the wire-transfer method incurs necessary delays in the input, transmission, authentication, and execution by the recipient business. For example, this method requires the requesting party to provide identification information which is entered and then transmitted by the local financial institution so that it may be authenticated and approved by the customer's home financial institution. Thus, several opportunities are created for errors to occur which may subsequently result in a delay in the customer's request. Should errors occur, manual intervention and investigation then becomes necessary.

The transfer of funds between countries is especially complicated. For example such transactions are closely regulated by various governments. Accordingly, with any attempt to simplify the transfer of funds, a need exists to ensure that the system complies with pertinent government regulations.

Yet another complication with the international transfer of funds results from the use of different currencies. In particular, because the transferred funds should be in the form of a different currency than that used in the country of the transferring institution, it is necessary for the requesting party to be made aware of the applicable exchange rate, preferably before the transaction is consummated. However, this usually involves the customer having to calculate the equivalent value of the foreign currency.

Currently, most consumer banking institutions utilize a network of automated teller machines (ATMs) which permit customers to more readily transfer funds between accounts. This permits the customer to perform such transactions substantially in real time (without any necessary time lag for settlement). Some systems now utilize ATM networks to permit a customer while in one country to access his or her account in another country. However, these systems do not provide the benefit of enabling one to conveniently transfer funds from an account in a first country to another account in a second country.

Accordingly, there is a need to provide a more convenient and reliable system and method by which customers may transfer funds, particularly across international borders and in different currencies. More specifically, there is a need for a system which permits the convenient and reliable transfer of funds by a customer into another account. There is a related need to provide such transactions in a user friendly readily understood manner.

SUMMARY OF THE INVENTION

It is an object of the invention to overcome the shortcomings discussed above with a system for transferring funds instantly to an account maintained in the same or another bank business through the use of a terminal such as an ATM, home banking phone, personal computer, conventional telephone or the like. The system according to the invention allows funds to be transferred to an account based on customer information which can be automatically accessed by the system, rather than needing to be manually entered. Further, the system automatically computes the appropriate exchange rate and any fees to be charged to the account and displays them to the user so that the user may authorize or cancel the transaction. The system also analyzes the parameters of the transfer to assure that the transfer conforms with pertinent government regulations. The system also enables the user to quantify the amount to be transferred in the currency of the originating account or the currency of the receiving account, thereby maximizing the flexibility of the system.

The system further is designed so that it can be understood and accessed by individuals having no special expertise in computers, wire transfers and the like.

Further, the system is provided with various safeguards to assure that only authorized individuals have access to the accounts and the funds.

BRIEF DESCRIPTION OF THE DRAWINGS

In the drawings:

FIG. 2 is a diagram illustrating the functions of various elements of the system of FIG. 1 in a process in accordance with the present invention.

FIGS. 13-1 and 13-2 are flowcharts showing a "Check Response to Message" sub-process in accordance with an embodiment of the present invention.

DETAILED DESCRIPTION OF THE PREFERRED EMBODIMENTS

Figure 1:
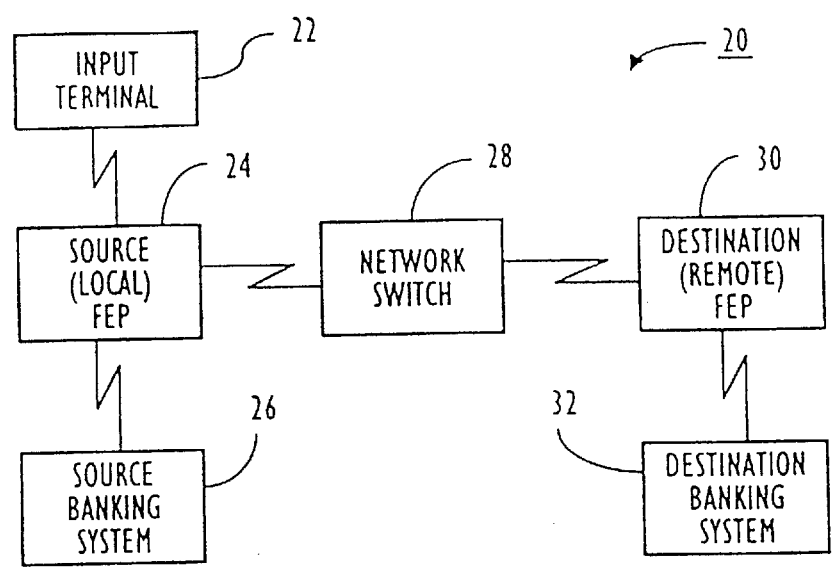
FIG. 1 is a block diagram showing a system according to the present invention.

FIG. 1 is a block diagram showing an overview of a system 20 according to the invention. Transfer transactions take place through an interaction between a user and a input computer terminal 22, for example, a home banking telephone, a personal computer (PC) or an ATM. In the preferred embodiment, this interaction is accomplished with a series of messages which are displayed to the user and various responses and requests which are input by the user through some type of input means such as a telephone keypad, a computer keyboard or a touch screen.

The input terminal communicates with a source front end processor computer (FEP) 24 through a series of electronic messages. In this example, the source or local FEP is coupled to a source banking system 26 and a remote FEP 30 through a network switch 28. As shown, the remote FEP 30 is connected to a destination banking system 32. For the purposes of processing transfers to external banking systems, the destination banking system 32 places transfer funds into a transfer holding account 34. The funds, for and external transfer, are then transmitted to the destination's local clearing system 36. Once processed through the local clearing system 36, the external transfer funds are deposited into the final destination external banking system 38. Accordingly, the various FEPs and the network switch together comprise an ATM network which may be accessed through various types of input terminals, including ATMs. Each element of this network includes suitable processing capabilities, including a CPU and associated memory. For example, in the preferred embodiment, several computer systems offered by STRATUS® are utilized.

With the system shown in FIG. 1 and in accordance with the method described herein, it is possible to request a transfer of funds from a source banking system to a second destination banking system located within a predetermined region supported by the application. An overview of a method for performing such an operation is generally described in reference to FIG. 2.

Figures 1, 13:
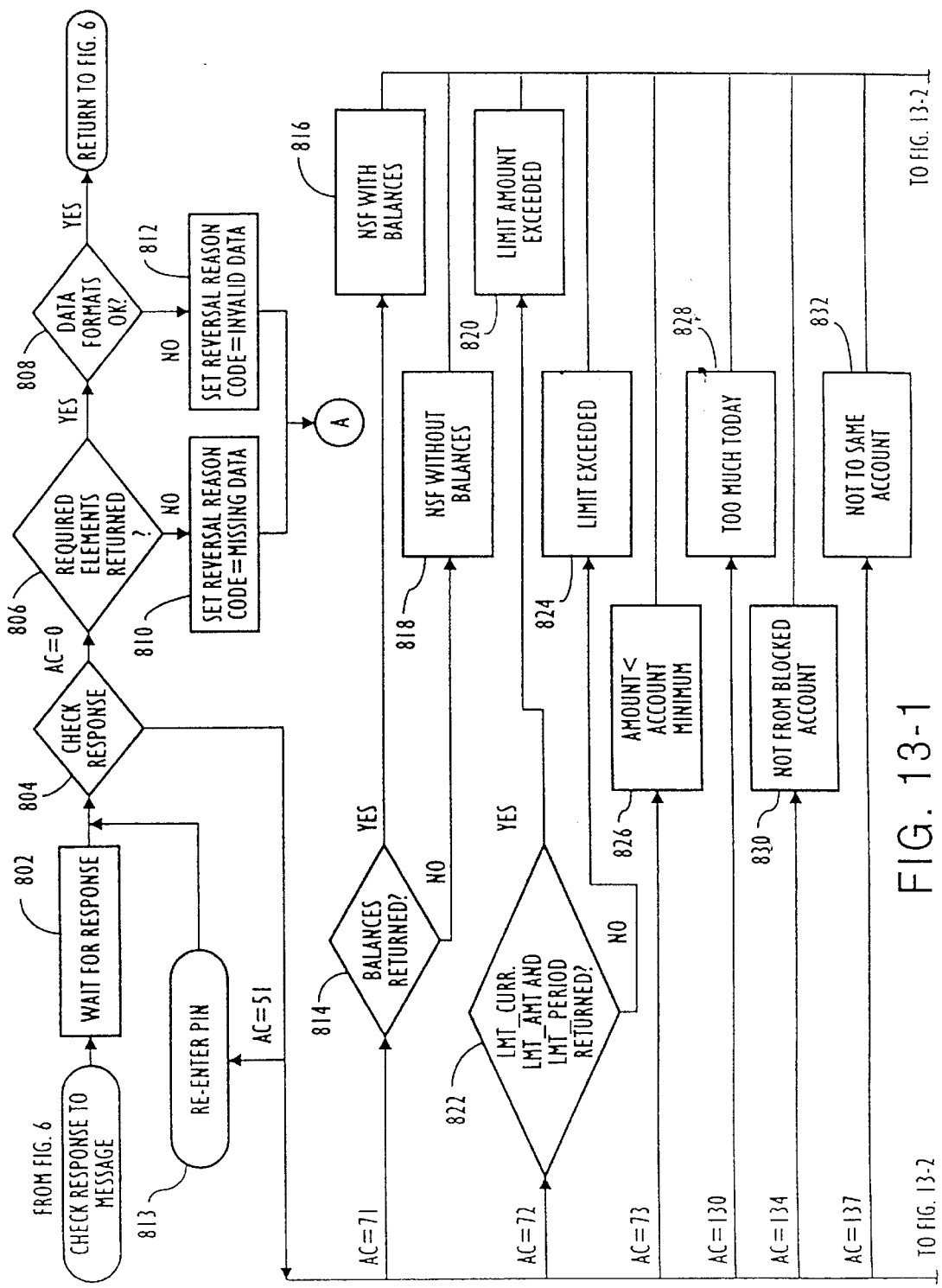
Figures 2, 13:
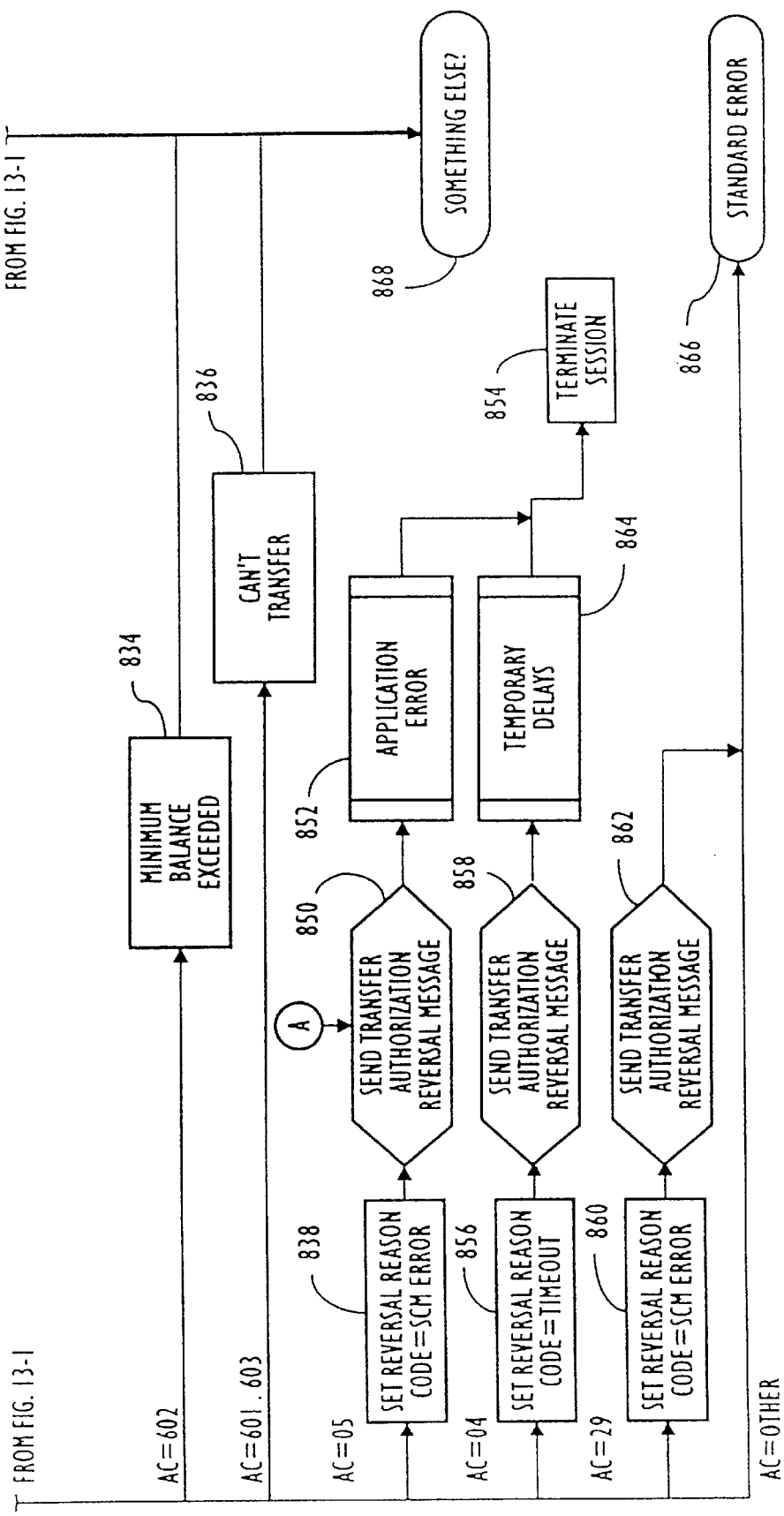

FIG. 2 illustrates the interaction of the elements of the system of FIG. 1 in a twenty one step process according to the invention. In FIG. 2, each step is represented by a row, while each element of the system is designated by a column. Elements of the system which are active during a particular step are indicated by a darkened box.

At Step 1, an application menu is displayed on the input terminal after the user has successfully passed various screening techniques, for example, by the user correctly entering a preselected personal identification number (PIN). Based on this display, the user is given the option of selecting a transfer operation in accordance with the invention. Upon selection of this option, at Step 2 the terminal device requests a list of available recipient businesses from the local FEP. At Step 3, a list of recipient businesses received from the local FEP is displayed by the input terminal. At this point the user selects one recipient business from this list. Preferably, this is accomplished by the user selecting the recipient business from a list. If applicable for the chosen recipient business, a screen is then displayed explaining which part of an account number may be required, and the user is prompted for the account number of the destination account.

At Step 4, the terminal sends an account validation request to the local FEP to determine whether the account number entered by the user corresponds to a valid account. At Step 5, the local FEP passes this request to the network switch. Based on the recipient business which was selected by the user, the network sends this request to the appropriate remote FEP at Step 6. At this point the remote FEP verifies that the requested destination account number is valid and responds with the currency used with the destination account. Alternatively, an error code indicating that the requested account was not found or cannot accept the credit is provided by the remote FEP. Based on originator information embedded in the message, the network switch sends the response back to the local FEP at Step 7. At Step 8, the local FEP passes the response back to the user terminal for display to the user.

At Step 9, the response from the remote FEP is displayed to the user. If the response indicated that an error occurred in the process, the error is displayed to the user and the transaction is terminated. Otherwise, the user is prompted to select a source account for the transfer. If the currencies of the source and destination accounts differ, the user is prompted to select a currency for the transfer amount. The user is also prompted to enter an amount for the transfer. The user is prompted to input an optional message to accompany the transfer. The terminal then displays a recap of the information entered by the user, and the user is prompted to confirm whether the details of this recap are correct. If the user indicates that the details of the requested transfer are incorrect, the transaction is terminated, and a screen confirming this termination is displayed.

At Step 10, the terminal sends a message requesting fees and foreign exchange information to the local FEP. At Step 11, the local FEP passes the request on to the network switch. The network switch returns a currency exchange rate or an error code if either the source currency or the destination currency is not supported by the system. Preferably, a predetermined value is returned if the source and destination currencies are the same.

At Step 12, if the response from the network switch is not an error code, the local FEP calculates a fee for the transaction and checks that the amount of the transfer is within permitted financial limits. The local FEP then returns the foreign exchange information and the fee information (or an appropriate error code) to the terminal. At Step 13, if the response from the local FEP was an error response, this is displayed to the user and the transaction is terminated. Otherwise, the terminal displays the fee and any exchange rate and currency equivalent. The user is then prompted to confirm whether to proceed with the transfer. If the user chooses not to proceed, the transaction is terminated and a screen confirming this is displayed to the user.

If approved by the user, at Step 14 a request to execute the transfer is sent to the local FEP. The local FEP verifies that the source account has sufficient funds and that no block on the transfer of such funds is present. If this verification fails, the local FEP returns an error code to the terminal, which then displays an appropriate error message and terminates the transaction.

If verification is provided, at Step 15 the local FEP posts a debit to the source account and passes the execute request to the network switch. The network switch then verifies that the currency rate is still valid. In the unlikely event that the currency rate is not still valid, the switch returns an error to the local FEP to cancel the transaction at the terminal.

At Step 16, if the above-described conditions have been met the network switch passes the execute request to the remote FEP. The remote FEP then posts a credit to the beneficiary account. If the selected transaction is an Inter-Bank External Transfer, the credit is posted to a transfer holding account 34 for future transfer to the destination's local clearing system 36 to be posted as credit to the final destination account in the Destination External Banking System 38. If the posting is successful, the remote FEP returns a completion code to the network switch. Otherwise an error code is returned.

At Step 17, on receipt of a successful completion code the network switch initiates settlement between the two businesses by accruing corresponding entries on their head office settlement accounts, and then returns a completion code to the local FEP. Otherwise, the network switch returns any error code which it received from the remote FEP.

At Step 18, if an error code is returned to the local FEP, it reverses the debit entry posting and returns the error code to the terminal. Otherwise it returns the completion code it received. At Step 19, the terminal displays a message to the user indicating a success or failure of the transaction.

At Step 20, during an Inter-Bank External Transfer, the remote FEP communicates the transaction's information about the amount, source account, destination account, and any attached messages to the destination's local clearing system. The local clearing system will process the requested transfer of funds between banking systems. At Step 21, after verifying the Inter-Bank transfer, the local clearing system will post a credit of the transfer amount to the destination account within the external banking system.

Figure 3:
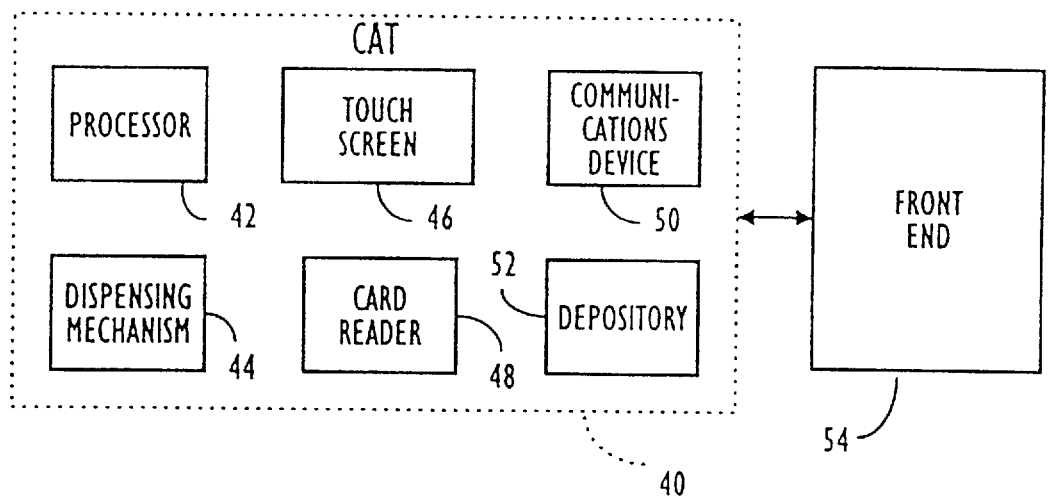
FIG. 3 is a block diagram illustrating components of a customer-activated terminal.

The input terminal referred to in FIG. 1 may comprise any of a variety of devices. In a preferred embodiment of the invention, it is contemplated that a particular type of ATM developed by the present assigned be used. This type of ATM is referred to herein as a customer activated terminal (CAT). Unlike many other ATMs which function primarily or solely as cash dispensing machines, CATs provide a wide range of banking functionality. These include "basic" services such as cash withdrawal, deposits and payments, transfer between accounts, balance inquiries, transaction histories, and purchases of travelers checks. As shown in FIG. 3, a CAT 40 includes structures generally corresponding to those found in a conventional ATM to carry out these functions. Standard structures include a magnetic card reader 48 for reading information encoded on a customer's card, a depository 52 for accepting deposit and payment envelopes, a cash dispensing mechanism 44 and a printer (not shown). Internal components include a processor 42 and a communications device 50 for data communication with a front end system 54. Memory devices associated with the processor 42 are also provided in order to permit the CAT to operate in the manner described herein.

The CAT 40 also utilizes more advanced structures in comparison to many conventional ATMs. For example, the primary customer interface is a dynamic touch screen 46 which utilizes color graphics. This interface is more versatile than many other ATMs in that it is readily reconfigurable. This permits the CAT to more easily accommodate newly developed functionality. Moreover, it provides an interactive display in which buttons and keys are replaced with images of familiar three-dimensional objects.

The CAT 40 is used in accordance with the invention to implement a variety of functions. The various levels of software implemented with the CAT is illustrated in FIG. 4.

Figure 4:
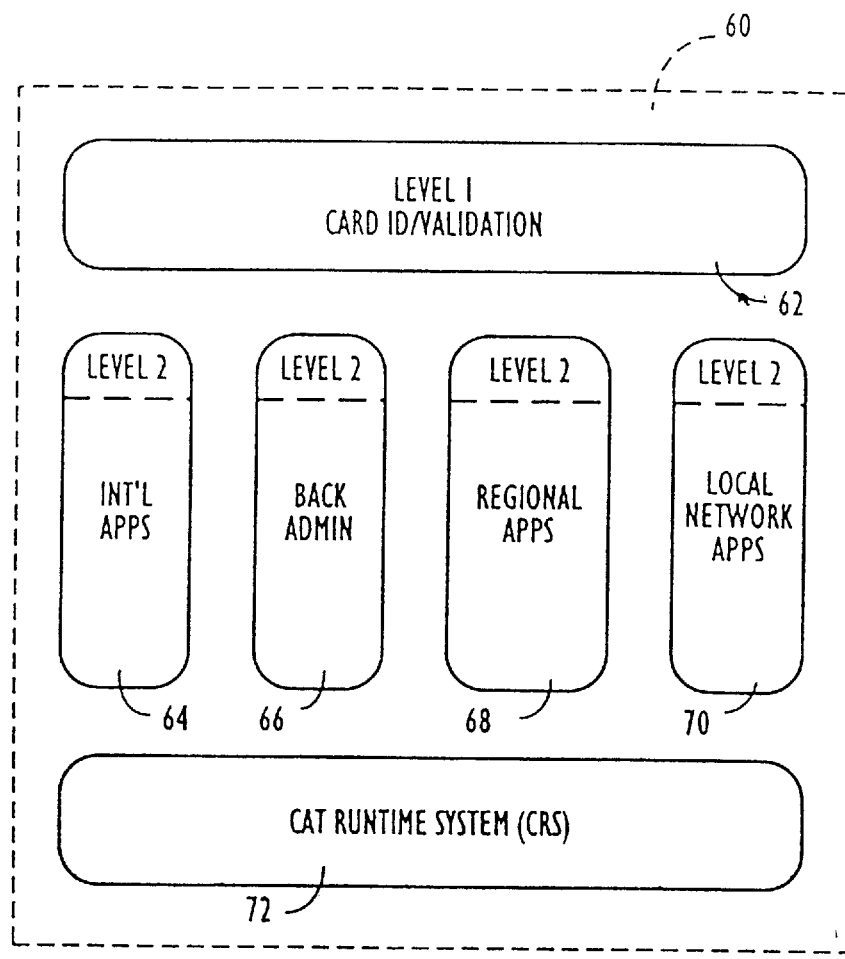
FIG. 4 is an overview of the software architecture for a customer-activated terminal.

FIG. 4 is a block diagram showing an overview of the software architecture 60 for a CAT used in accordance with the present invention. In this example, the software architecture shown is stored locally by the CAT. As updates to this software are required, they are implemented through an associated FEP by updating configurable tables stored by the CAT in memory. This approach permits a substantially standard interface to be provided by terminals world-wide, while also enabling CATs in particular countries to be conveniently adapted to ensure compliance with various regulatory authorities.

As shown in FIG. 4, the CAT software architecture 60 is represented by levels, labelled in the drawing as "Level 1," "Level 2," and a CAT Runtime System (CRS). The CRS 72 basically serves as the operating system for the CAT. This system runs the aforementioned devices included with the CAT. For example, this system runs a card reader, a dispensing mechanism, a printer, and a touch screen. It also handles messages sent from the CAT to the FEP and response from the FEP to the CAT. In operation, the CRS will be initiated in accordance with methods known in the art in order to provide the other functions described herein.

Once the CRS 72 has been initiated, the CAT should be ready to begin an on-line session with a user. The initial steps in an on-line process are controlled by Level 1, shown as block 62 in FIG. 4. In this example, Level 1 is initiated when a customer's card is inserted into the CAT. At this point, Level 1 is used to validate the card and identify any customer accounts associated with the card. This is typically accomplished by interpreting information read by the card reader from a magnetic stripe provided on the card. For example, Level 1 interprets data which represents the financial institution which issued the card. The CAT then consults a table to determine how to handle accounts associated with cards from that institution. The CAT then performs a validation routine in which the customer is requested to input a PIN which is checked against a customer record associated with the customer's account number obtained from the card.

Once identification and validation have been accomplished, the various Level 2 applications shown under Level 1 are initiated. These include international applications 64, a back administration application 66, regional applications 68, and local network applications 70.

In this example, the international applications 64 referred to in FIG. 4 involves transactions extending beyond a particular geographic area in which transfers can be made in accordance with the invention. For example, if the system is configured to permit transfers among accounts in particular European countries and Level 1 determines that a customer requesting an on-line transaction is from Brazil, the transactions available to the customer would be provided through the international applications 64.

The back administration application includes particularized functions available only to authorized individuals possessing a specially coded card. For example, if Level 1 determines that a user has inserted a specially coded card, various administration functions are then made available, such a end of the day balancing of the funds remaining the CAT against transactions handled by the CAT.

In this example, the regional application 68 is software designed for the geographic area in which the system according to the invention is implemented. The communication system which permits data transfer among the various elements described in FIG. 1 may form a part of the regional application 68.

The regional application 68 serves many functions. For example, it determines the language for the on-line session with the customer. More specifically, it enables the session to be conducted in a selected language based on the origin of the customer's card. For instance, if a customer from France accesses a CAT in Germany, the regional application run by the German CAT would run the on-line session in the French language based on the Level 1 identification of the customer's card as originating with a French financial institution.

The regional application 68 permits the customer to perform functions involving host systems extending the beyond the CAT accessed by the customer. These higher level functions are referred to as "Level 3." For example, it permits the process described above in reference to FIG. 2 in which transfers of funds can be made from an account with a bank in a first country to an account with a bank in a second country.

Local network applications 70 handles functions for cards identified as being issued by institutions affiliated with a local network of banks. For example, in the United States, networks such as the CIRRUS® network permit individuals to perform certain transactions at terminals provided by affiliated institutions. These applications are implemented in accordance with techniques known in the art. Generally, cards which access functions through the local network applications 70 cannot access functions available through the other Level 2 applications.

Figure 5:
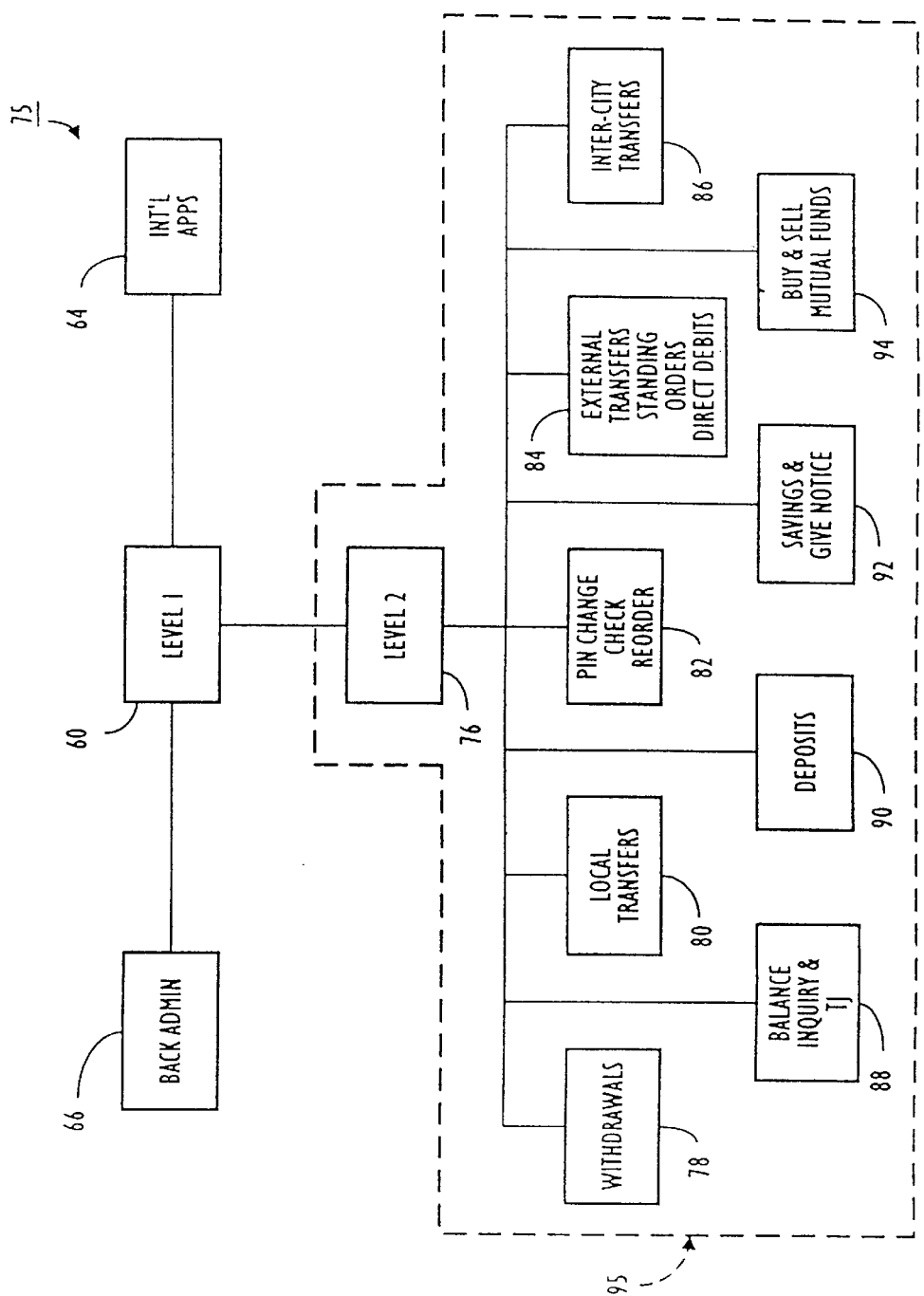
FIG. 5 is a more detailed block diagram showing the software architecture for a customer-activated terminal.

FIG. 5 shows in more detail the software architecture described in reference to FIG. 4. Below the box 60 labelled "Level 1," is a box 76 labelled "Level 2." This represents the code shared by all CATs in a particular geographic region. As shown in the region 95 encompassed by a dashed line, the "Level 3" applications which are included in this code include: a withdrawal application 78; a balance inquiry and transaction journal (TJ) application 88; a local transfer application 80; a deposit application 90; a PIN change and a check reorder application 82; an application permitting external transfers, standing orders, and direct debits 84; a buy and sell mutual funds application 94; the Intra-Bank transfer application 86; and the Inter-Bank External transfer application 96.

The withdrawal application 78 handles cash withdrawals at the CAT. The balance inquiry and TJ application 88 permits the user to determine current balances and recent transactions. The local transfer application 80 permits transfers between "associated" accounts with a single banking institution, for example, between a checking account and a savings or money market account.

The PIN change and check reorder application 82 permits a user to change his or her PIN and to reorder checks on-line. The savings and give notice application 92 permits the customer to obtain information concerning a particular savings account, for example, recent activities and accrued interest.

The external transfers, standing orders and direct debits application 84 handles several different functions which together constitute a payment system. It allows a customer to transfer funds from their account to, for example, pay bills. It permits one time payments or executes standing orders for periodic payments to be made. It also handles direct debits to the customer's account, for example, through point of sales transactions.

The buy and sell mutual funds application 94 is described more particularly in co-pending application Ser. No. 08/483, 710. The regional transfer to application is described in more detail below.

A more specific description of the interface between the user and the system described above is now described with reference to FIGS. 6 to 14. While this process is particularly well suited for implementation with the aforementioned CAT, it will be appreciated by those skilled in the art that a variety of terminals are available for implementing the process described below including personal computers and home banking telephones.

At the outset, it is noted that the flowcharts comprising FIGS. 6 to 12 are primarily directed at the interaction between the terminal and the user. For example, rectangular-shaped boxes refer to discreet processes executed by a CAT (such as a particular display screen) and triangular shaped boxes refer to decisions made by the CAT. Six-sided shapes refer to messages exchanged with the CAT and the rest of the system (for example, from a remote host). These messages include data elements which permit execution of the process described below.

Figure 6:
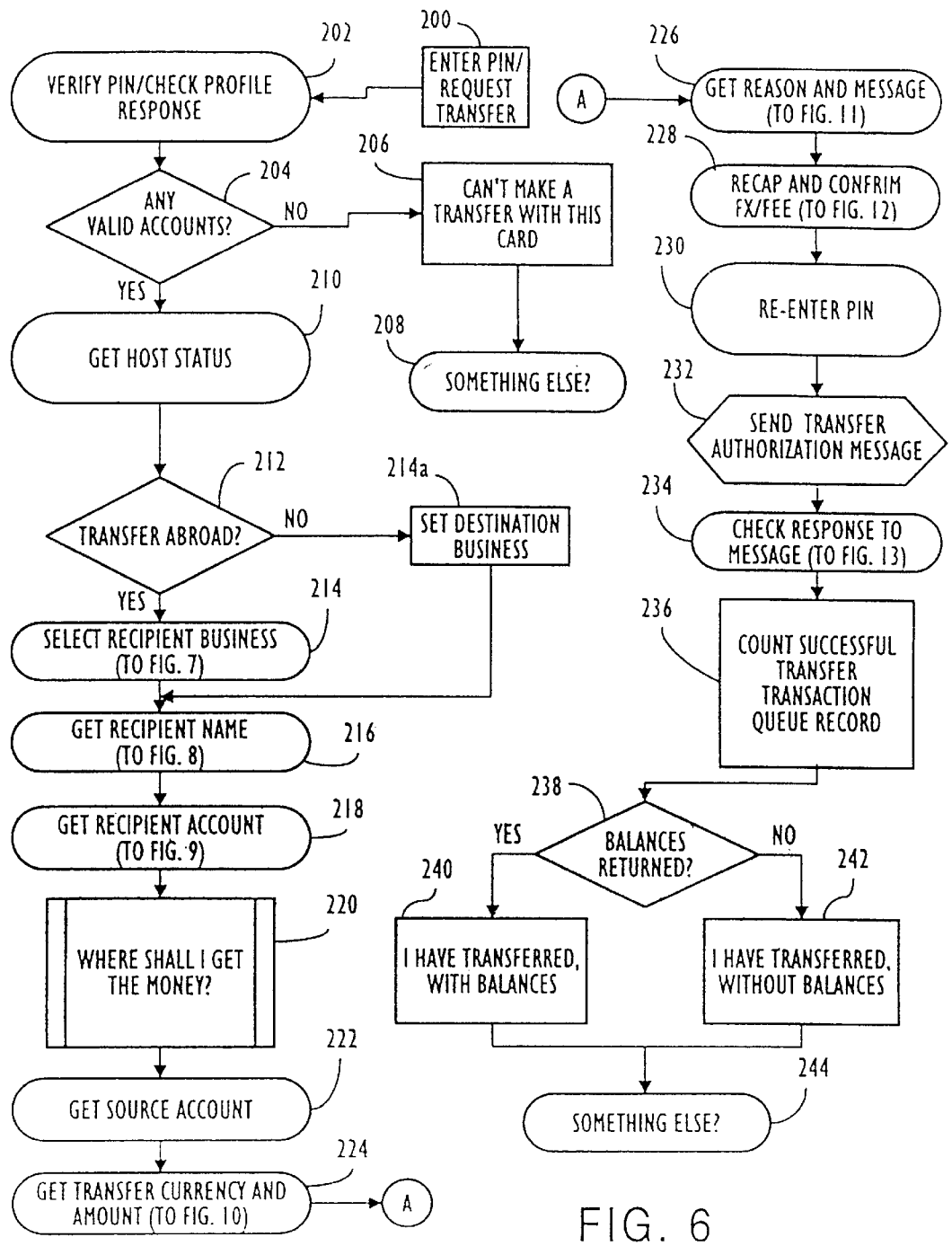
FIG. 6 is a flowchart showing a main process according to an embodiment of the present invention.

FIG. 6 describes the main flow of the process according to the invention. In order to initiate this process, the customer will have entered a personal identification number (PIN) and have indicated to the system that a transfer function is desired (Step 200). At Step 202, the system verifies that the PIN entered by the customer is correct according to the techniques known in the art. At this point, the system obtains profile information linked to the customer's card which shows, for example, how many accounts may be accessed with the card.

Assuming that a correct PIN has been entered, at Step 204 the system verifies that the accounts linked to the customer's card are available for performance of a transfer in accordance with the invention. For example, the system consults a look-up table stored in memory which indicates the various types of accounts which are permitted for such transfer functions. Approved accounts might include a checking account, a related credit card account or other accounts provided by the customer's financial institution. If the customer does not have an account linked to the customer's card that is available for a transfer function, a screen is displayed at Step 206 which states that a transfer cannot be made with the customer's card, and the customer is given an option of performing other transactions at Step 208.

Assuming that a valid account is available, at Step 210 the FEP which is linked to the CAT (that is, the local FEP) attempts to determine the status of the host system. If the host system provides a message indicating that it is available to perform transactions, the process continues. The customer is then asked at Step 212 to indicate whether the customer desires to transfer funds from an account to another account outside the country of his home account. For example, if the customer has an account in Greece and wishes to transfer funds to another account located in the United Kingdom, the customer would indicate that a transfer abroad is desired. If no transfer abroad is desired, the CAT automatically sets the destination business at Step 214a. If a transfer abroad is indicated by the user, a routine is implemented at Step 214 to select a recipient business. This routine is described in reference to FIG. 7.

Figure 7:
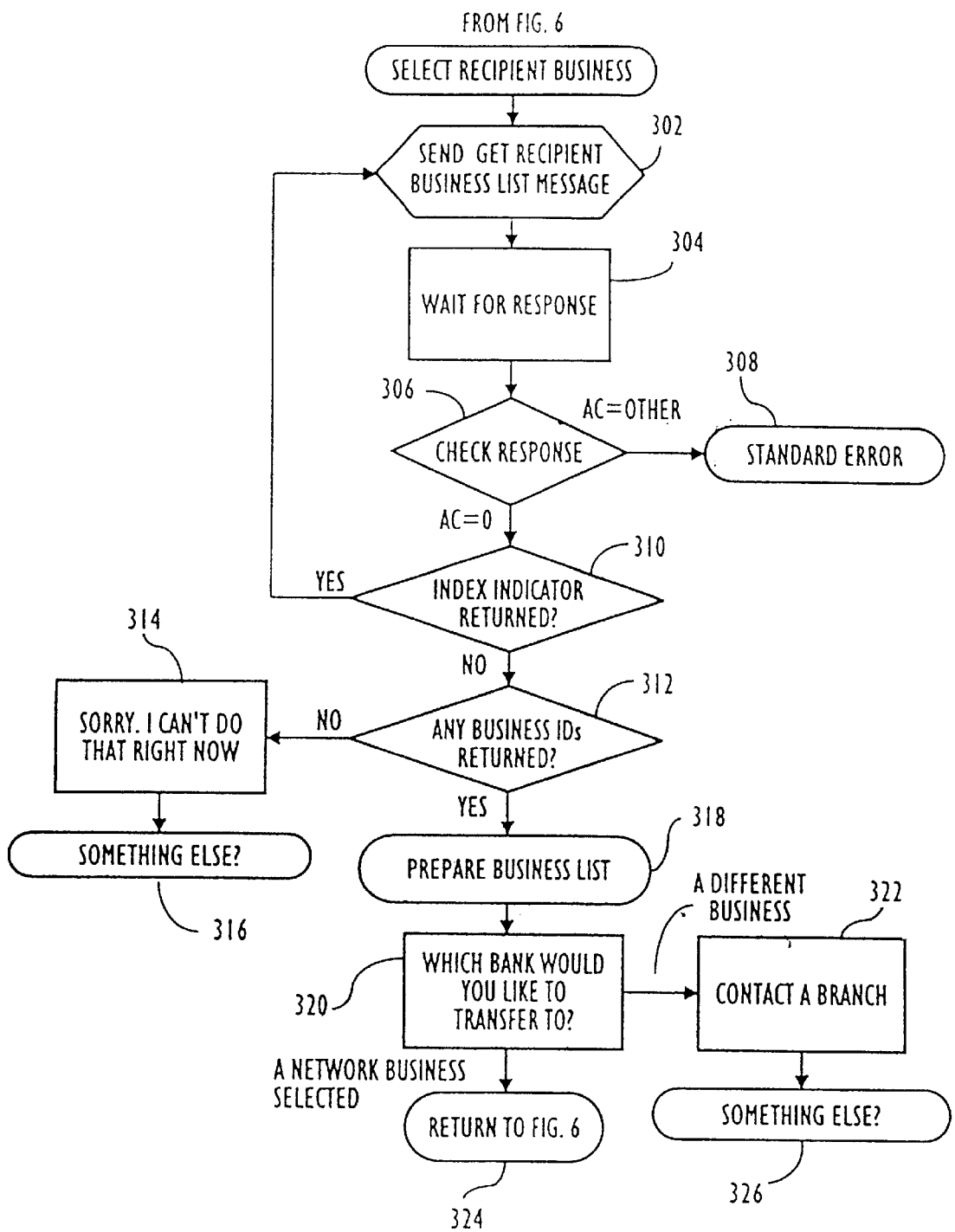
FIG. 7 is a flowchart showing a "select recipient business" sub-routine in accordance with an embodiment of the present invention.

As shown in FIG. 7, the system determines which recipient businesses are available or are allowed. At this point, an electronic message is sent to the FEP linked to the AT (Step 302), and the CAT waits for a response as sown in Step 304. Specifically, the CAT waits for a response designated as an "action code" (AC). The response is checked by the CAT at Step 306. If the AC is any value other than zero, an error code is displayed to the customer at Step 308. For example, the CAT might display a message such as "Sorry cannot help you."

If the AC is equal to zero (meaning no error has occurred), the CAT receives a list of potential recipients. Because it is unknown how many recipients are available, an index indicator is used to keep track of the number of responses as illustrated at Step 310. Specifically, an index indicator is set to a non-zero value until no more response are provided. If more than a predetermined number of recipients, for example fifty, are provided a first batch is saved and the process is repeated at Step 310 until the index indicator reaches a zero value.

At Step 312, the system determines whether any business IDs (identification numbers) corresponding to available recipient businesses have been returned. If not, a message is displayed to the customer at Step 314 indicating that this function is not available. At Step 316 a standard options screen is displayed asking if the customer desires to perform another transaction. On the other hand, if business IDs do come back, a comparison procedure is implemented at Step 318.

The CAT then compares a list of businesses which is saved locally in a table with all the messages that have been previously retrieved from the host. If the two lists are identical, the CAT displays what is on the locally-saved list. If the messages and the locally-saved table are not identical, this indicates that the host has newly-updated information that has not been previously provided to the CAT. In such a case, the updated list is displayed to the customer.

For example, at Step 320 the CAT would display sequentially various screens, each showing a predetermined number of recipient businesses. For example, each screen may be limited to displaying four banks at a time. The customer is then given the option of scrolling back and forth until a desired recipient bank is displayed. As each screen is displayed, the customer is given the option of selecting one of the displayed banks or indicating that a different bank which is available for transfer transactions is desired. If a different bank is desired, at Step 322 the user is instructed to contact a representative. For example a screen such as the one shown below is displayed in correspondence with Steps 322 and 326 of FIG. 7.

```
I'm sorry. I can't transfer money to any other
businesses yet.
For further assistance, please contact a branch or
call XXXXXXXXXXXXXXX
May I help you with something else?
   YES              NO
                              EXIT
```

Figure 8:
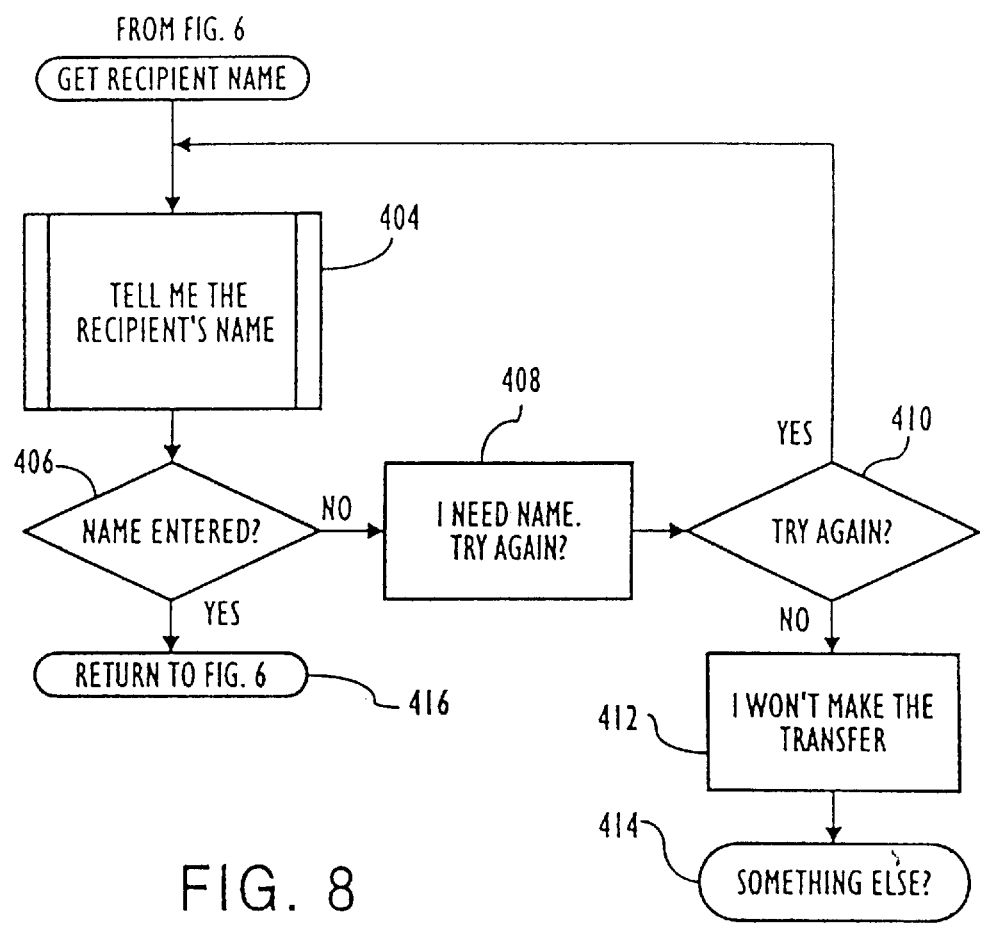
FIG. 8 is a flowchart showing a "get recipient name" sub-process in accordance with an embodiment of the present invention.

If the customer wishes to select a listed business, the process continues as shown at Step 216 of FIG. 6 which corresponds to a "Get Recipient Name" sub-routine shown in FIG. 8.

In FIG. 8 the CAT displays a screen prompting the customer to input the name of the recipient party. Preferably, the customer uses a graphical alpha-numerical keyboard displayed on the touch screen of the CAT. For example, a screen such as the one shown below is displayed, in which a data element "recip__name__25" corresponding to the entered recipient name is obtained by the CAT:

```
Okay. Please tell me the name of the recipient.
Then touch ENTER.
                    recip__name__25
  ENTER      SPACE        ERASE       EXIT
```

If the customer has entered nothing or merely blank space characters, a screen such as the one shown below is displayed:

```
I'm sorry. I must have the name of the recipient in
order to make this transfer.
Would you like to try again?
   YES              NO
                              EXIT
```

At this point, the user is given the option of trying again or discontinuing the transaction. If the transaction is discontinued the CAT indicates that the transfer has been cancelled and prompts the user to indicate whether another service is desired. For example a screen such as shown below is displayed:

```
          Okay. I won't make this transfer.
          May I help you with something else?
        YES              NO
                                   EXIT
```

If the user does enter a name on the first or a subsequent attempt the process resumes with Step 218 shown in FIG. 6. This Step corresponds to a "Get Recipient Account Number" sub-routine which is described in reference to FIG. 9.

Figure 9:
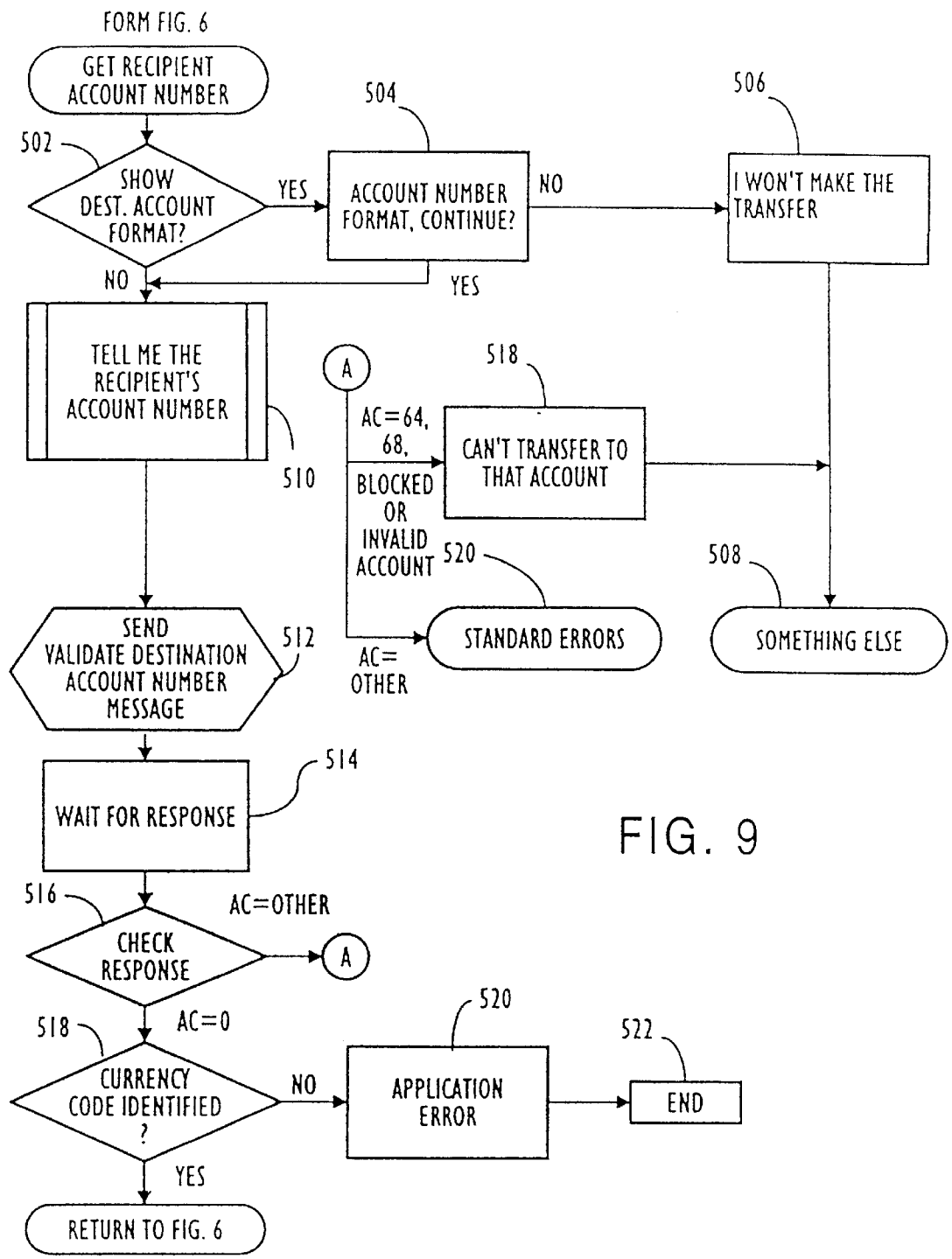
FIG. 9 is a flowchart showing a "get recipient account number" sub-process in accordance with the present invention.

In FIG. 9, the system consults a table to determine the destination account number format for the country in which the requested recipient is located. For example, several countries may have different possible formats, while others may not specify a particular kind of format. After consulting the table, at Step 502 the CAT determines whether it is necessary to display a required format to the customer so that the customer may proceed with the transaction. If so, the system continues as shown in Step 504; otherwise, the process continues with Step 510.

In Step 504, an Information Screen is displayed which shows the precise format for the account number information which is to be requested from the customer. In viewing this screen, the customer is given the option of proceeding with the transaction or terminating the transfer request. If the transfer is terminated by the customer then a confirmation message is displayed to the customer at Step 506, and the customer is given the option of requesting another transaction at Step 508. For example, a screen such as the following may then be displayed:

---
Okay. I won't make this transfer.
May I help you with something else?
YES            NO
                          EXIT
---

If a specific format is not required, or the customer indicates at Step 504 that the customer desires to continue, the CAT displays a request for the recipient's account number at Step 510. For example, the CAT may display a screen such as:

---
Please tell me the account number for recip_name_25.
Then touch ENTER.
---

A graphical keyboard is preferably with the screen described above so that the customer can conveniently input the requested information. The entered information is then retained as data element "recip_name_25."

At Step 512, the system verifies that the account number entered by the customer is a valid one. A message, including the account number entered by the customer (that is, data element "dst_acct_no") is then sent from the CAT to the front end and the remote FEP. This message requests verification and validation for the account number entered by the customer. The CAT then waits for a response to this request at Step 514. Preferably a screen is displayed to the customer indicating that the CAT is "waiting for a response." At Step 516 the CAT checks for a response. Similar to the method described above, the CAT performs this step by checking an Action Code (AC). If the Action Code is equal to any value which is non-zero, the process continues as shown by Connector A.

As shown from Connector A in FIG. 9, the system returns a predetermined value for the Action Code (AC). For example, an Action Code equal to 64 indicates that the account entered by the customer is a blocked account. Alternatively, an Action Code equal to 68 indicates an invalid account. In the case of either a blocked or invalid account, a screen is displayed at Step 518 indicating that the system cannot transfer account money to that particular account. For example, a screen such follows is then displayed to the customer:

---
I'm sorry. I can't transfer to the recipient account
you have given me.
Please contact a branch or call a bank
representative.
May I help you with something else?
YES            NO
                          EXIT
---

If the Action Code is some other non-zero value, at Step 520 the system provides a standard error message to the customer depending on the particular Action Code that is provided to the CAT.

If at Step 516, an Action Code having a zero value is obtained, this indicates that the destination business is available and the user has provided a valid recipient account number. At Step 519, the CAT examines the electronic message provided from the FEP to ensure that a valid currency code is included. The currency code information enables the system to subsequently perform a foreign exchange rate conversion. If it is discovered that no currency code is provided, the session is subsequently terminated at Step 522 after display of an appropriate error screen at Step 521. If a currency code is identified, the system continues with Step 900. This Step is defined as "Get Branch Route Code" and is described on FIG. 16.

Figure 16:
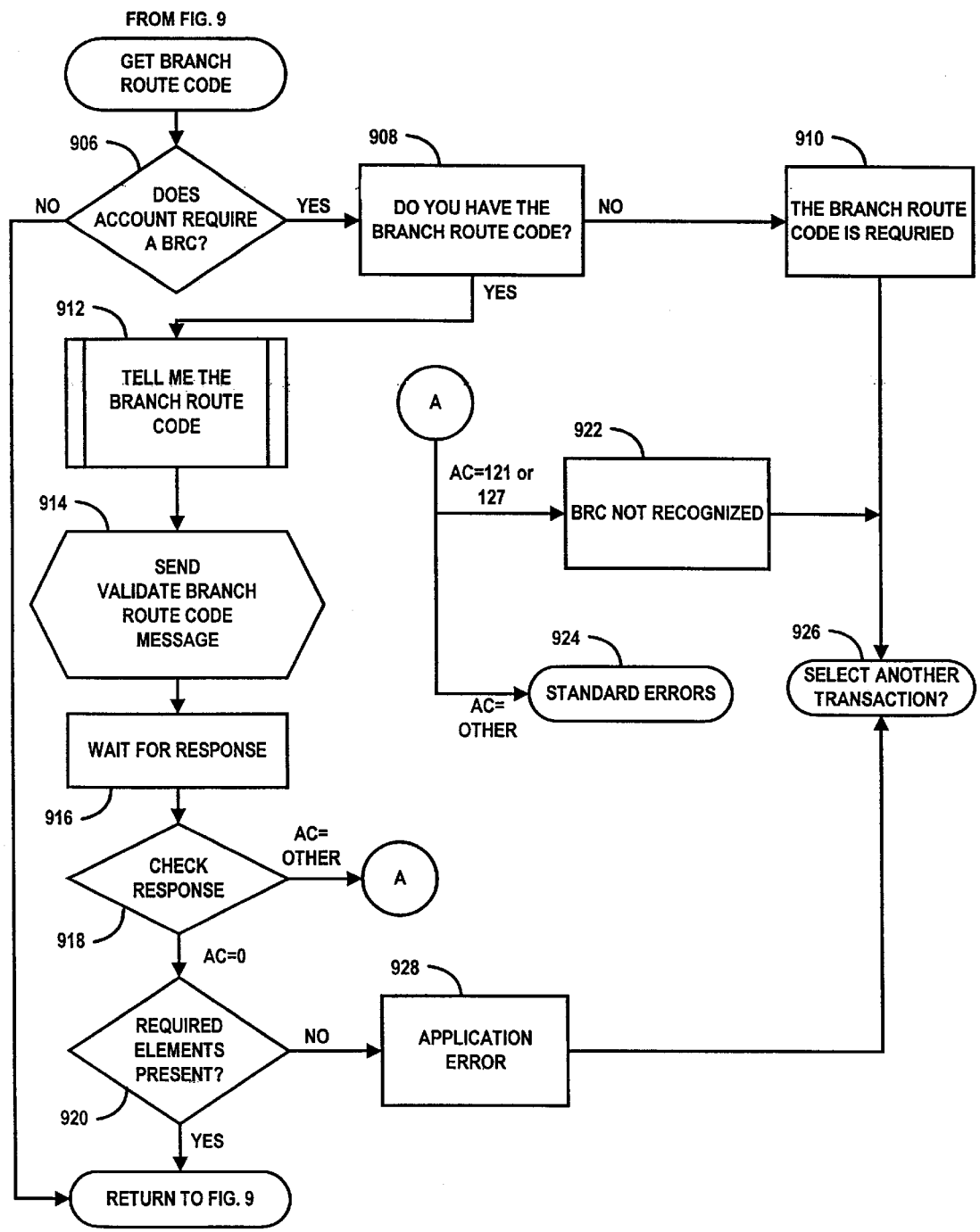
FIG. 16 is a flowchart showing a "Get Branch Route Code" sub-process in accordance with an embodiment of the present invention.

In FIG. 16 at Step 906, the system determines if the entered account requires a Branch Route Code. When a BRC is required, the customer is asked if they have the BRC at Step 908. For example, a screen such as the following may then be displayed:

---
To transfer money, I need the route
number of the branch you want to
transfer to.
The route number looks like this:
          999-999-99
Do you have the route number?
YES            NO
                          EXIT
---

At Step 910, if the customer does not have the required BRC, a message is presented that indicates the code is required. This message is followed by the option to request another transaction at Step 926.

If the customer does indicate they have the BRC, processing continues at Step 912 by asking for the Branch Route Code. The CAT may display a screen, preferably with a graphical keyboard, such as:

---
Please tell me the Branch Route Code.
Then touch ENTER
---

At Step 914, the system verifies that the Branch Route Code entered by the customer is a valid one. A message, including the BRC entered by the customer is then sent from is the CAT to the front end and the remote FEP. This message requests verification and validation for the Branch Route Code entered by the customer. The CAT then waits for a response to this request at Step 916. Preferably a screen is displayed to the customer indicating that the CAT is "waiting for a response." At Step 918 the CAT checks for a response, Similar to the method described above, the CAT performs this step by checking an Action Code (AC). If the Action Code is equal to any value which is non-zero, the process continues as shown by Connector A.

As shown from Connector A in FIG. 16, the system returns a predetermined value for the Action Code (AC). For example, an Action Code equal to 121 or 127 indicate an unrecognized BRC. In the case of an unrecognized code, a screen is displayed at Step 922 indicating that the system does not recognize the Branch Route Code. For example, a screen such as follows is then displayed to the customer:

---

I'm sorry. I do not recognize the Branch Route Code you have given me.
Please contact a branch or call a bank representative.
May I help you with something else?
    YES          NO
                                  EXIT

---

If the Action Code is some other non-zero value, at Step 924 the system provides a standard error message to the customer depending on the particular Action Code that is provided to the CAT.

If at Step 918, an Action Code having a zero value is obtained, this indicates that the user has provided a valid Branch Route Code. At Step 920, the CAT examines the electronic message provided from the FEP to ensure that all required elements are present. If it is discovered that not all required elements were provided, the session will present the options for other transactions at Step 926 after display of an appropriate error screen at Step 928. If all valid elements are present, the system returns to the main process shown in FIG. 6 at Step 220.

At Step 220 of FIG. 6, the system displays a request for the customer to indicate the source account for the money to be transferred. The available accounts are displayed based on account information previously obtained from the host in accordance with techniques described, for example, in co-pending application Ser. No. 08/483,710. In this manner, the system automatically obtains the information which would otherwise have to be manually entered.

Once this information has been entered, the system performs a "Get Source Account" sub-routine at Step 224. These sub-routines are described with reference to FIG. 10.

Figure 10:
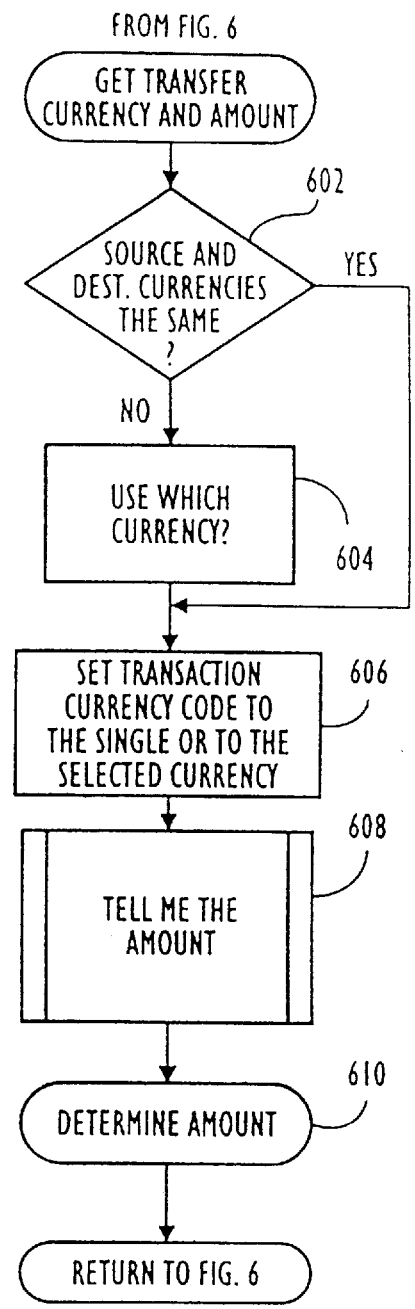
FIG. 10 is a flowchart showing a "get transfer currency and amount" sub-process in accordance with an embodiment of the present invention.

As shown in FIG. 10, at Step 601, the system determines whether the transaction selected is an Inter-Bank External Transfer. If the transaction is an Inter-Bank ET, then at Step 603 the system sets the transaction currency to the currency of the transaction destination and then continues processing at Step 608. Otherwise, at Step 602 the system determines whether the requested source and destination currencies are the same. If they are the same, the process continues with Step 606. If the source and destination currencies are not the same, for example, if a transfer is being made from an account in a first currency to an account in a second currency, then the process continues with Step 604. At Step 604 the CAT prompts the customer to indicate the type of currency the customer wishes to use to specify the amount to be transferred. For example, if the customer wishes to transfer an amount from an English account (based on pounds) to a French account (based on French francs), the customer can indicate the customer's preference for the currency in which they will specify the amount to be sent. For example, a screen such as the one shown below may be displayed to the customer where the data elements "curr_desc1" and "curr_desc2" correspond to textual descriptions of the respective currencies used in the source and destination countries:

---

How would you like to tell me the amount to send?
In curr_desc1 to be paid to the recipient.
In curr_desc2 to be taken from my account
                                              EXIT

---

Once the customer has indicated the type of currency to be used or if they are the same, at Step 606 the transaction code is set appropriately to either the common currency or the currency selected by the user at Step 604. The process continues at Step 608 by the CAT requesting the amount for the transaction. For example a screen such as the one shown below is displayed:

---

Please tell me the amount you want to transfer.
Then touch ENTER. Touch clear to erase.

---

While not shown above, it is preferred that this screen include a numerical keypad overlay which includes an "Enter" and a "Clear" Key. Preferably this numerical display includes comma and decimal characters which correspond to the common usage for the currency of the transaction. For example, when dealing with Belgian francs, normally decimal points are not used. At Step 610, the CAT interprets the entered amount and translates it to a format which the system can understand. The process then continues with Step 224 of FIG. 6.

Figure 11:
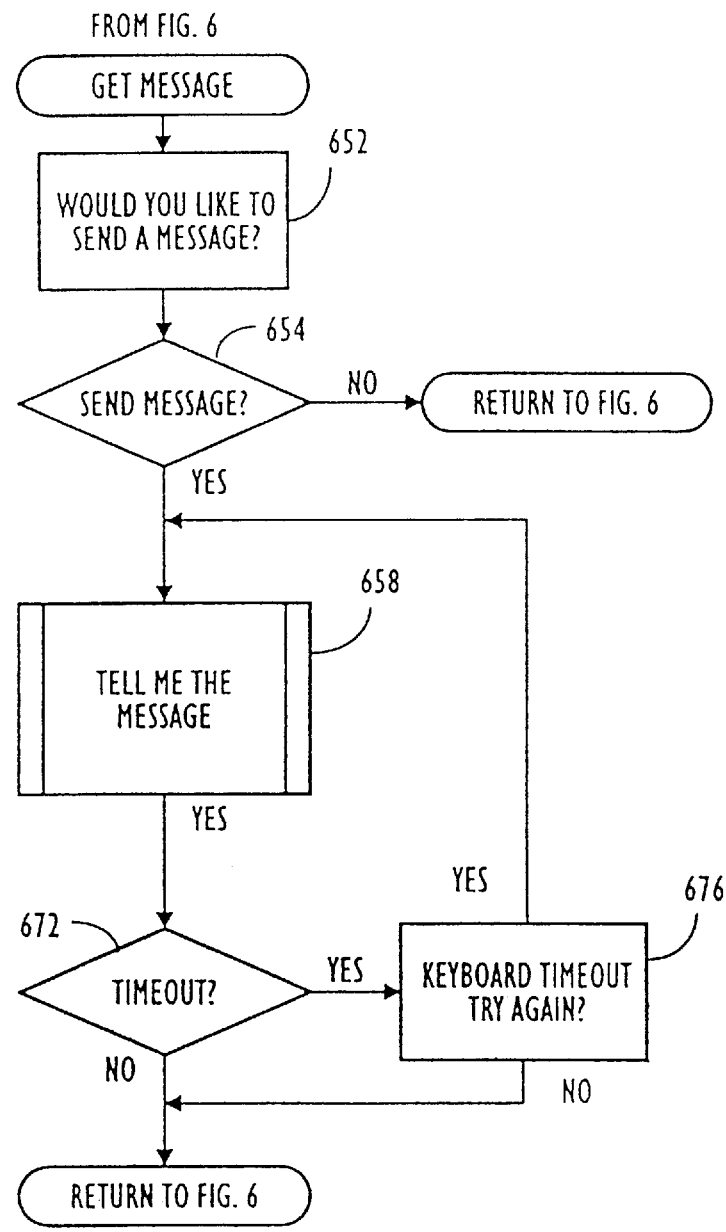
FIG. 11 is a flowchart showing a "get message" sub-process in accordance with an embodiment of the present invention.

The main routine shown in FIG. 6 then continues by implementing a "Get Reason and Message" sub-routine as shown in FIG. 11. This sub-routine provides the customer with the option of sending a message along with the transfer. For example at Step 652 a screen such as the one shown below is displayed:

---

Would you like to send a message with this transfer?
    YES          NO
                                  EXIT

---

If the customer indicates that no message is desired, the main routine of FIG. 6 continues with Step 228. Otherwise the process continues by displaying with the CAT a prompt for the customer to enter the message to be sent. For example a screen such as follows is displayed:

---

Please tell me the message.
Then touch ENTER.
                                trf_msg
ENTER        SPACE        ERASE        EXIT

---

While not shown above, it is preferred that this display include a graphical keyboard overlay based on the language used in the session. This permits the customer to enter a message which is stored by the CAT as a data element "trf_msg."

As shown at Step 672 in FIG. 11, this process includes a time-out routine in which a message is displayed to a customer after a predetermined time elapses in which no key has been pressed by the customer. For example, a message is displayed at Step 676 asking a customer whether the customer wishes to try again. If so, the process starts over again at Step 658. If not, the process simply returns to the main routine shown in FIG. 6.

Once any desired message has been entered by the customer, the main routine resumes as shown at Step 227 of FIG. 6. This corresponds to a "Get Remitter Name" subroutine in FIG. 17.

Figure 17:
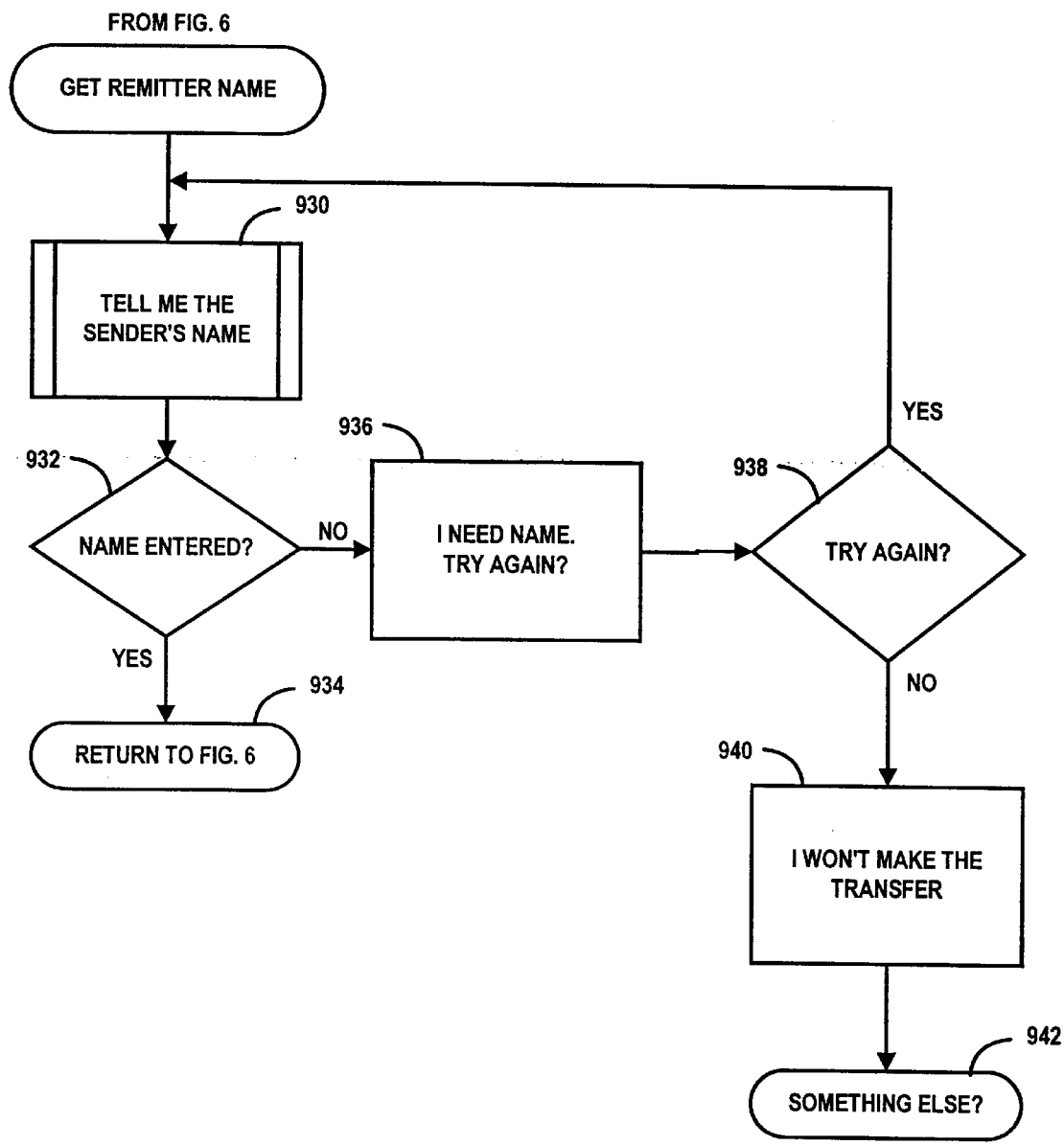
FIG. 17 is a flowchart showing a "Get Remitter Name" sub-process in accordance with an embodiment of the present invention.
Figure 5:
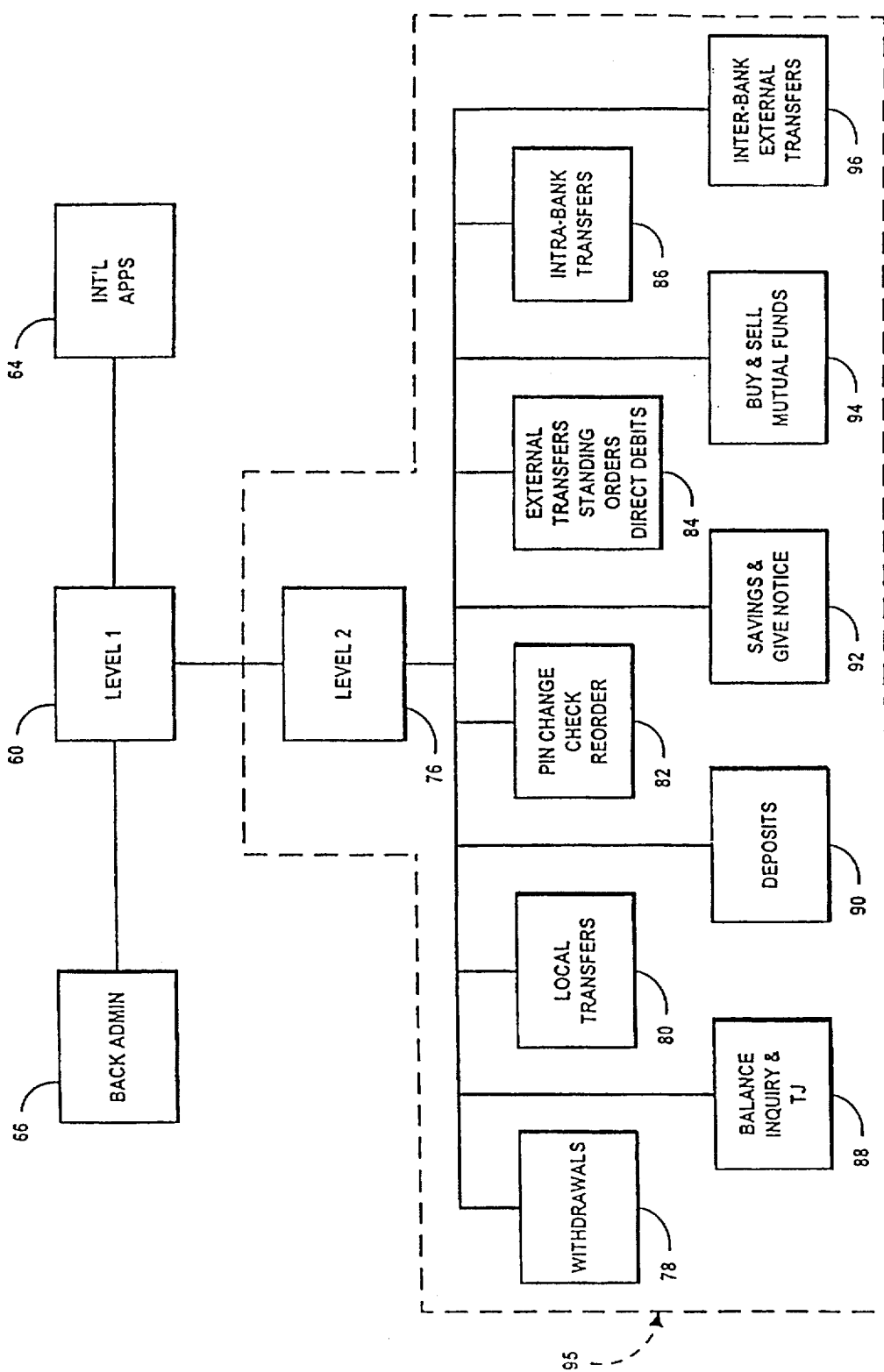
Figure 6:
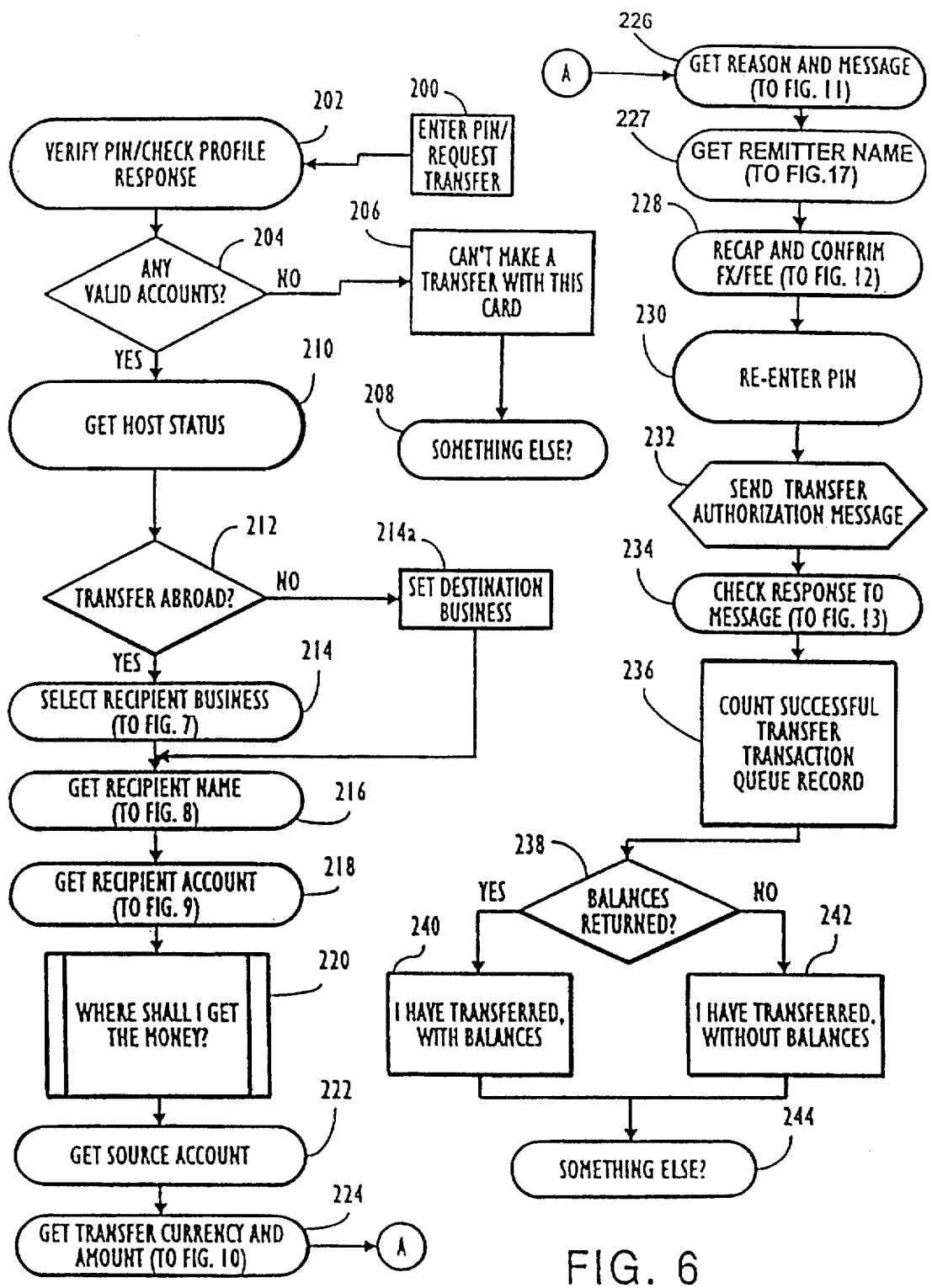
Figure 9:
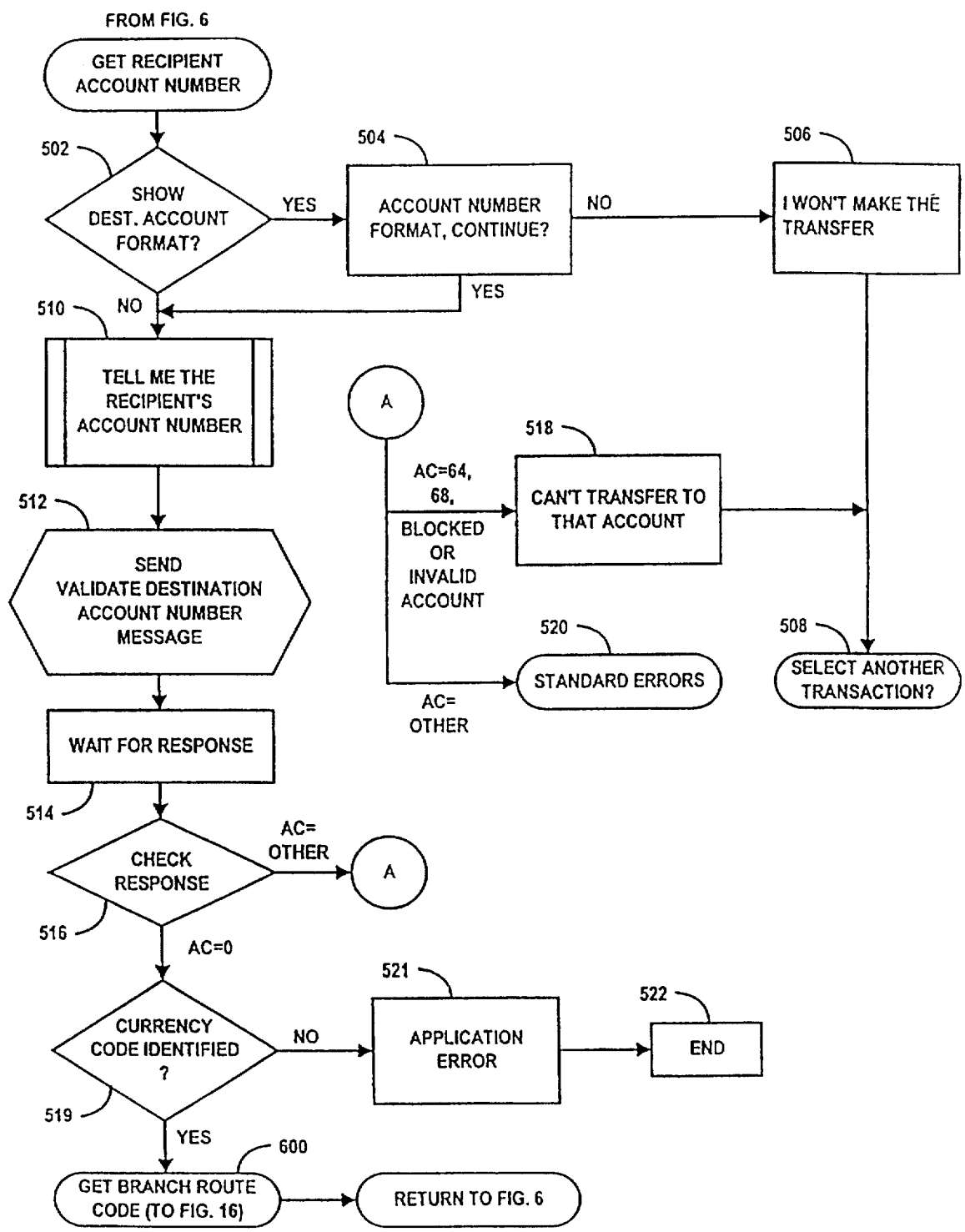
Figure 10:
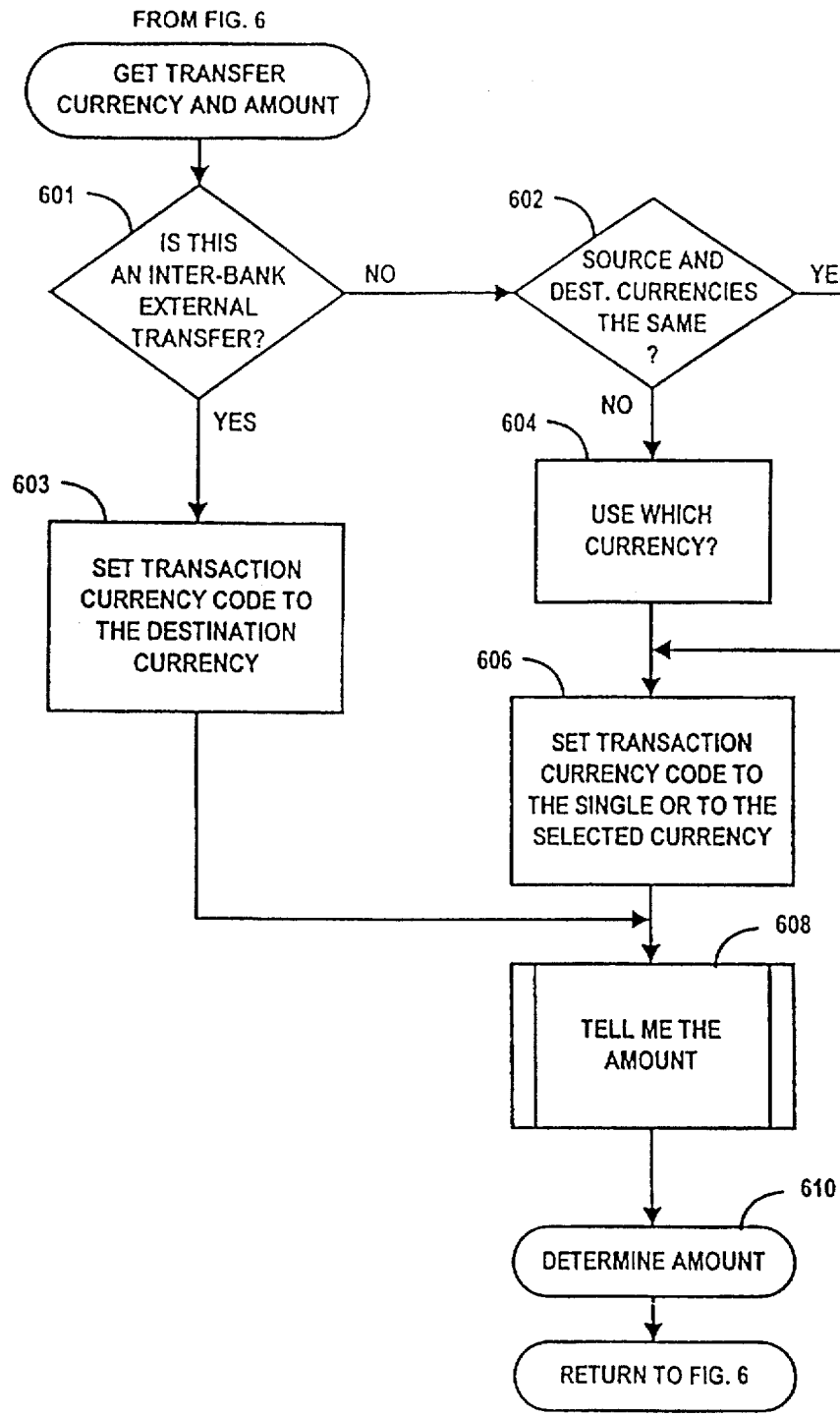
Figures 2, 13:
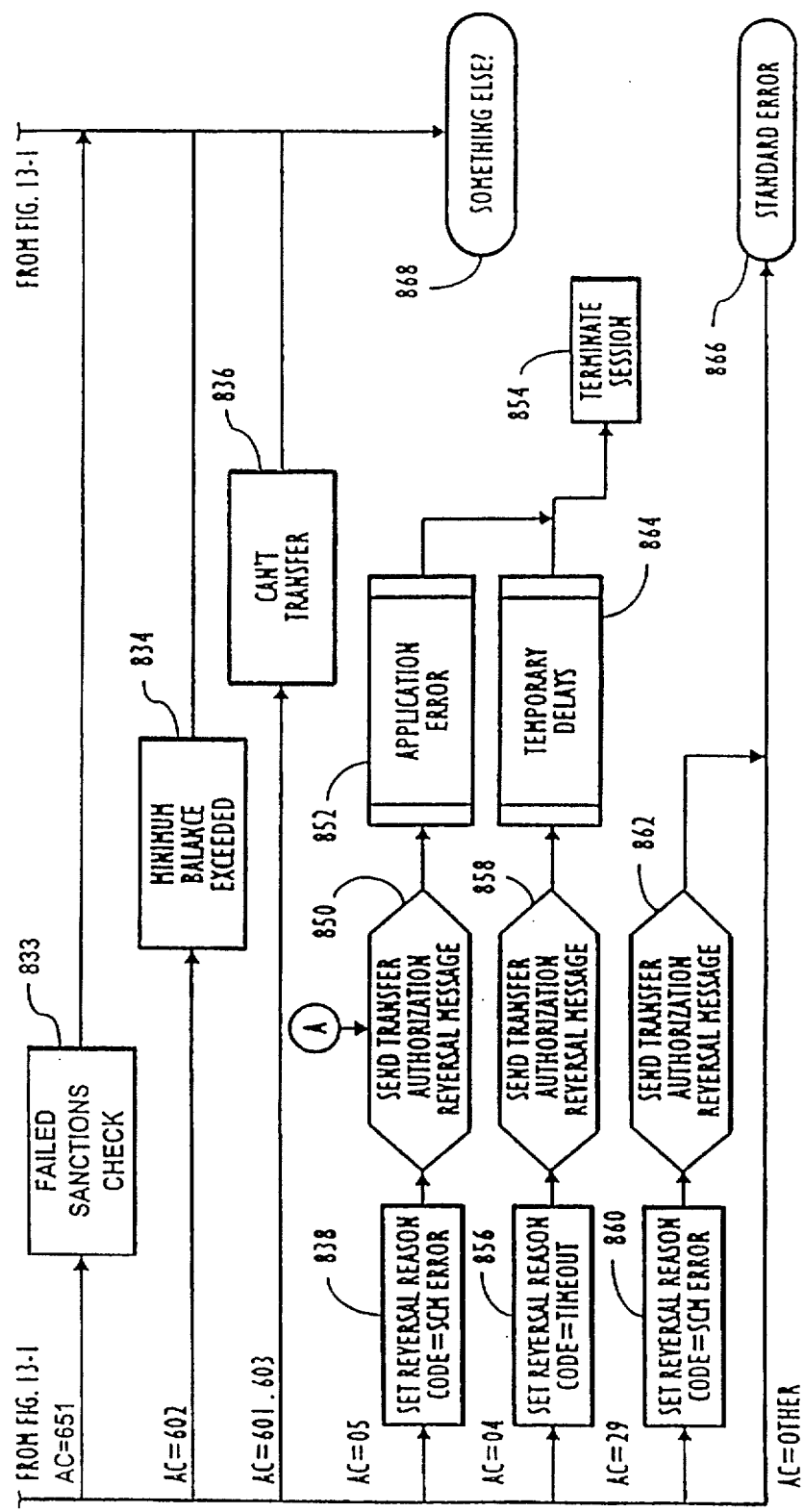

In FIG. 17 the CAT displays a screen prompting the customer to input the name of the remitter (sender) party. This process is similar to The Get Recipient Name described herein. Preferably, the customer uses a graphical alphanumerical keyboard displayed on the touch screen of the CAT. For example, a screen such as the one shown below is displayed, in which a data element "remit_name_25" corresponding to the entered remitter name is obtained by the CAT:

---
Okay. Please tell me the name of the remitter.
Then touch ENTER.
                           remit_name_25
ENTER        SPACE        ERASE        EXIT

---

If the customer has entered nothing or merely blank space characters, a screen such as the one shown below is displayed:

---
I'm sorry. I must have the name of the remitter in
order to make this transfer.
Would you like to try again?
    YES                 NO
                                           EXIT

---

At this point, the user is given the option of trying again or discontinuing the transaction. If the transaction is discontinued the CAT indicates that the transfer has been cancelled and prompts the user to indicate whether another service is desired. For example a screen such as shown below is displayed:

---
Okay. I won't make this transfer.
May I help you with something else?
    YES              NO
                                          EXIT

---

If the user does enter a name on the first or a subsequent attempt the process resumes ash shown at Step 228 of FIG. 6. This corresponds to a "Recap and Confirm FX/Fee" sub-routine described in reference to FIG. 12.

Figure 12:
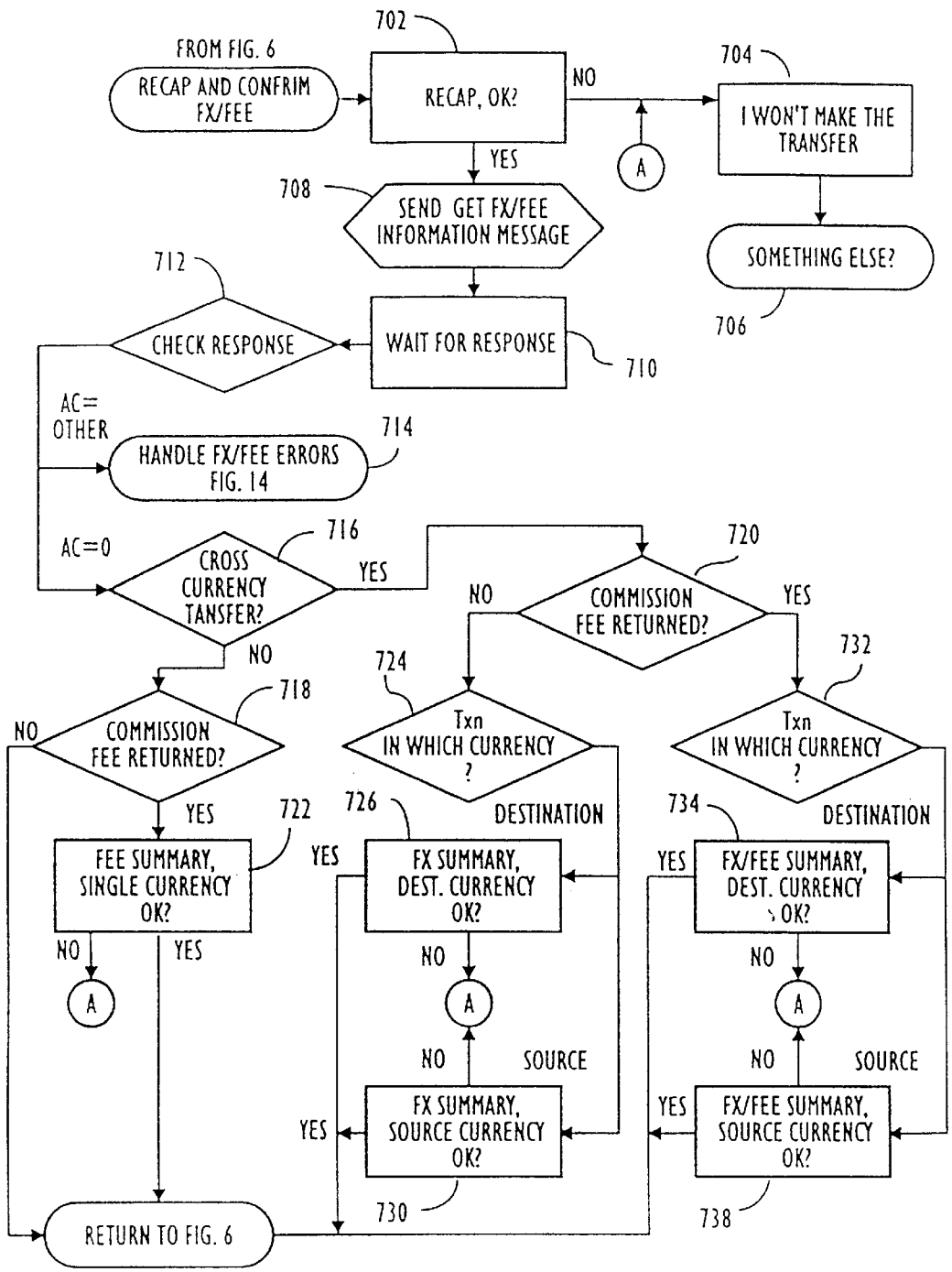
FIG. 12 is a flowchart showing a "recap and confirm FX/Fee" sub-process in accordance with an embodiment of the present invention.

As shown in FIG. 12, the system recaps at Step 702 the information which has been entered by the customer.

If at this point, the customer indicates that the transaction is no longer desired, at Step 704 the system displays a message as described above that the transfer will not take place and the customer is given the option of performing another transaction at Step 706. If the customer does indicate that the information is correct and that a transfer is desired, at Step 708 the CAT sends a message referred to in the drawings as "Get FX/Fee Information." This message is sent to the host computer through the FEP and the CAT displays a message indicating at Step 710 that it is waiting for a response.

Figure 14:
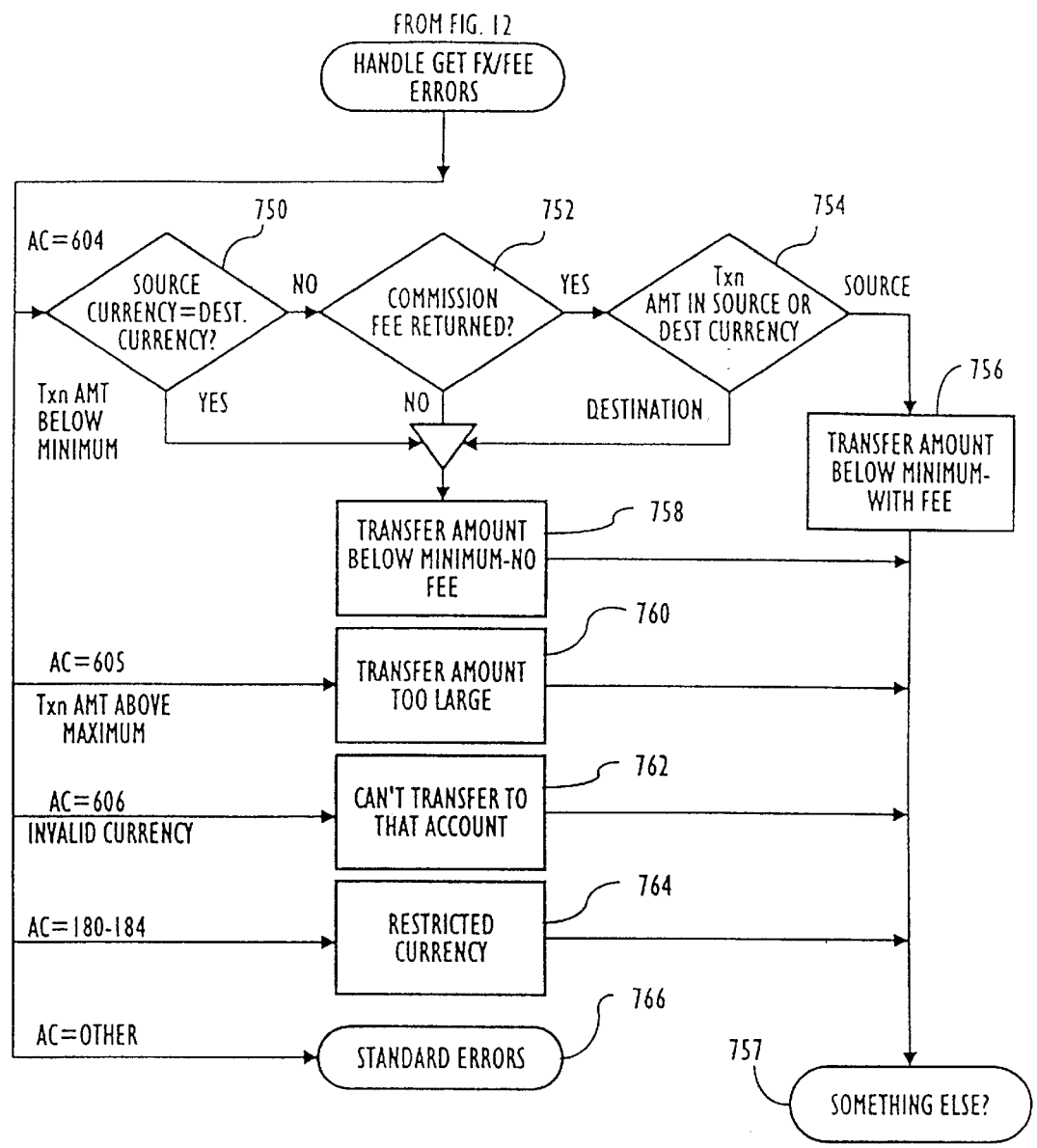
FIG. 14 is a flowchart showing a "Handle FX/Free Errors" sub-process in accordance with an embodiment of the present invention.

The CAT then checks the response obtained from the FEP at Step 712. Again an Action Code (AC) is checked to determine how to proceed. If a non-zero Action Code is returned, the process continues at Step 714 as shown in FIG. 14. This process corresponds to a "Handle Get FX/Fee Errors" sub-routine.

As shown in FIG. 14, the process continues depending on the value of the Action Code. For example, an Action Code of 604 corresponds to a transaction amount below a predetermined minimum amount. As a result, at Step 750, the CAT determines whether the source currency is the same as the destination currency. If so, the process continues with Step 758. Otherwise, the process continues with Step 752. This decision ensures that transactions involving transfers are above a predetermined limit.

If the source currency and the destination currency differ, the system then determines at Step 752 whether a commission fee is applicable. This depends on the particular host of either the source country or the destination country. If no commission fee is applicable, the process continues with Step 758. If a commission fee is applicable, the process continues with Step 754.

If a commission fee is applicable, at Step 754 it is determined whether the transaction amount was input in the source currency or the destination currency. If the transaction is in the destination currency, the process continues with Step 758. Otherwise, the process continues with Steps 756 and 757. For example, if one was in England and requested a transfer of a certain amount of pounds and a fee was associated with this transaction, a screen would be displayed stating that the transaction is below a minimum with the fee. The following screen might be displayed:

---
I'm sorry. I can't do that.
After deducting a fee of comm_fee_s,
the remaining amount to be transferred is
src_eqv_amt_s.
The smallest amount I can transfer is
lim_amt_s.
To arrange your transfer, please contact a bank
representative.
May I help you with something else?
   YES                 NO                EXIT

---

As shown, this message includes several data elements including "comm_fee_s" corresponding to the format commission fee with currency descriptor based on source currency code; "src_eqv_amt_s" corresponding to a format source equivalent amount with currency descriptor based on source currency code; and "lim_amt_s" corresponding to a format limit amount with currency descriptor based on a limit currency code.

If the source currency was the same as the destination currency, no commission fee was returned from the system, or the transaction amount is in the destination currency, a "Transfer Amount Below Minimum—No Fee" message is displayed as shown in Step 758. This message may take the following form:

---
I'm sorry. I can't do that.
The smallest amount I can transfer is
lim_amt_s.
To arrange your transfer, please contact a branch or
call a bank representative.
May I help you with something else?
   YES                NO
                                        EXIT

---

As indicated, this screen includes the data elements "lim_amt_s" described above.

In this example, an Action Code of 605 indicates that the transaction amount is above a predetermined maximum amount. This results in a message being displayed at Step 760 indicating that this limit cannot be exceeded. For example, a screen such as follows is displayed by the CAT:

---

I'm sorry. I can't do that.
The largest amount I can transfer is
lim_amt_s.
To arrange your transfer, please contact a branch or
a bank representative.
May I help you with something else?
    YES            NO
                        EXIT

---

In this example, an Action Code of 606 indicates that an invalid currency has been entered. As a result, at Step 762 the following message is displayed: "I'm sorry. I can't transfer to the recipient account you have given me."

This process according to the invention also provides for additional types of restriction. For example, in international transactions it is possible that a particular government may wish to impose a restriction on transfers of specific currencies. For example, the Greek government may impose a restriction on transfers in Greek Drachmae. In such a case, at Step 764 a transaction involving two different currencies would result in an error message such as described below:

---

I'm sorry. I can't do that.
This acct_desc39 is in a restricted currency.
May I help you with something else?
    YES            NO
                        EXIT

---

This message includes the data element "acct_desc39" which corresponds to the account description text based on the source product type selected by the customer, for example, checking account, savings account and so forth. Again the customer is given the option of requesting another transaction with overlaid graphical "Yes," "No," and "Exit" keys.

Other Action Codes are handled in a similar manner by consultation of a table corresponding to standard errors as illustrated by Step 766.

Resuming the description of FIG. 12 at Step 716, if a zero Action Code is returned by the system, the CAT determines whether a cross-currency transfer has been requested. This involves determining whether the source currency is the same as the destination currency. If they are the same, no cross-currency transfer takes place and the process continues as shown in Step 718. If a cross-currency transfer is being requested the process continues as shown in Step 720.

As shown in Step 718, the CAT determines whether a commission fee has been returned by the FEP. If not, the process resumes with the main routine of FIG. 6 at Step 230. If commission fee has been returned, a fee summary for the single currency transaction is displayed at Step 722 and the customer is requested to indicate approval of the transaction. For example the following information is displayed:

---

I'm ready to transfer
txn_amt_s
to recip_name_25
The fee for this transfer
is comm_fee_s
The total amount to be deducted from
your acct_desc
eqv_txn_amt_s
Shall I go ahead?
    YES            NO            EXIT

---

As indicated above, this screen displays the information corresponding to several data elements which are configured in the steps described above. For example, the "txn_amt_s" data element corresponds to the format transaction amount. The currency descriptor for this data element is based on a transaction currency code set earlier in the process. The "recip_name_25" data element corresponds to the displayed recipient name entered by the customer. The "comm_fee_s" data element corresponds to the format commission fee with currency descriptor base don the source currency code which is obtained by the system. "The acct_desc" data element corresponds to text describing the customer's account, for example, "checking," "savings," or so forth. The "eqv_txn_amt_s" data element represents the entire amount deducted from the customers source account, including the transfer amount and any applicable fees. If the customer indicates approval for the transaction the proceeds continues as shown in FIG. 6. Otherwise, the CAT indicates that no transfer will be made and the customer is given the option of performing additional transactions as shown in Steps 704 and 706.

If a cross-currency transfer has been requested, at Step 720 the ACT examines whether a commission fee has been returned. If not, this indicates that the remitter's host country for the transfer do not charge any fees for a transaction. In this case, at Step 724 the system displays a summary of the transaction in either the destination currency (Step 726) or the source currency (Step 730). The destination currency summary (Step 726) may be displayed as follows:

---

I'm ready to transfer
txn_amt_s
to recip_name_25
The current exchange rate is
fx_mult/fx_curr1/fx_rate/fx_curr2
The total amount to be deducted from
your acct_desc6
will be eqv_txn_amt_s
Shall I go ahead?
    YES            NO
                        EXIT

---

As indicated above, this display includes the following data elements:

| Data Name | Comments |
|---|---|
| txb_amt_s | Format Transaction Amount with currency descriptor based on the Transaction Currency Code. |
| recip_name_25 | Displays Recipient Name entered by the customer. |
| fx_mult | If the value of Exchange Cross Rate obtained from the system (Step 708) is less than 0.1, displays a value for fx_mult of 10, 100, or 1000 such that the value of exchange Cross Rate times fx_mult is between 0.1 and 1.0. Otherwise, displays 1. |
| fx_curr1 | If Exchange Format Flag obtained from the system (Step 708) is 3, displays the descriptor for the currency of the destination account. If it is 4, displays the descriptor for the currency of the source account. |
| fx_rate | Displays the value of Exchange Cross Rate obtained from the system (Step 708) times the value of fx_mult described above. (This results in a value between "0.10000" to "99,999.00000.") The exchange rate format is ZZsZZZdZZZZ, where "s" is the thousand separator and "d" is the decimal character. Suppresses all decimal values equal to zero that exceed the number of decimal places supported for the currency. For currencies that do not use decimal places, if the exchange rate is returned as a whole number, the decimal character is not displayed. |
| fx_curr2 | If Exchange Format Flag is 3, displays the descriptor for the currency of the source account. If it is 4, |

-continued

| Data Name | Comments |
|---|---|
| | displays the descriptor for the currency of the destination account. |
| acct_des6 | Displays account description text_a based on the source Product Type selected. |
| eqv_txn_amt_s | Format Equivalent Transaction Amount with currency descriptor based on Equivalent Transaction Currency Code obtained from the system (at Step 708). This Equivalent Transaction Amount is displayed in green. |

The display for the source currency summary (Step 730) may be displayed as follows:

```
I'm ready to transfer
txn_amt_s from your
src_prod9
The current exchange rate is
fx_mult/fx_curr1/fx_rate/fx_curr2
The total amount to be paid to
recip_name_25 is
dst_eqv_amt_s.
Shall I go ahead?
    YES           NO           EXIT
```

The data elements for the source currency display includes the following:

| Data Name | Comments |
|---|---|
| txn_amt_s | Format Transaction Amount with currency descriptor based on the Transaction Currency Code. |
| src_prod9 | Displays account description text_a based on the source Product Type selected |
| fx_mult | If the value of Exchange Cross Rate obtained from the system (Stem 708) is less than 0.1, displays a value for fx_mult of 10, 100, or 1000 such that the value of Exchange Cross Rate times fx_mult is between 0.1 and 1.0. Otherwise, displays 1. |
| fx_curr1 | If Exchange Format Flag obtained from the system (Step 708) is 3, displays the descriptor for the currency of the destination account. If it is 4, displays the descriptor for the currency of the source account. |
| fx_rate | Displays the value of Exchange Cross Rate obtained from the system (Step 708) times the value of fx_mult described above. (This results in a value between "0.10000" to "99,999.00000.") The exchange rate format is ZZsZZZdZZZZ, where "s" is the thousand separator and "d" is the decimal character. Suppresses all decimal values equal to zero that exceed the number of decimal places supported for the currency. For currencies that do not use decimal places, if the exchange rate is returned as a whole number, the decimal character is not displayed. |
| fx_curr2 | If Exchange Format Flag is 3, displays the descriptor for, the currency of the source account. If it is 4, displays the descriptor for the currency of the destination account. |
| recip_name_25 | Displays Recipient Name entered by the customer. |
| dst_eqv_amt_s | Format Destination Equivalent Transaction Amount with currency descriptor based on the destination Currency Code obtained from the system (Step 708). |

Alternatively, if a commission fee is applicable for the transaction, a summary is provided in either the destination currency or the source currency format. For example, the summary for the destination currency with fee (Step 734) may be displayed as follows:

```
I'm ready to transfer
txn_amt_s
recip_name_25.
At the current exchange rate of
fx_mult/fx_curr1/fx_rate/fx_curr2,
this amount is equivalent to src_eqv_amt_s.
The fee is comm_fee_s.
The total amount to be deducted from your
acct_desc6 will be
eqv_txn_amt_s.
Shall I go ahead?
    YES           NO           EXIT
```

The data elements for the destination currency with fee format (Step 738) are the same as described above, except for the following additional data elements:

| Data Name | Comments |
|---|---|
| src_eqv-amt_s | Format Source Equivalent Transaction amount with currency descriptor based on Currency Code of the source account obtained from the system (Step 708). |
| comm_fee_s | Format Commission Fee with currency descriptor based on Source Currency Code obtained from the system (Step 708). |

The source currency with fee summary (Step 733) may be displayed as follows:

```
I'm ready to transfer
txn_amt_s from your
src_prod9.
After deducting a fee of
comm_fee_s
the remaining amount to be transferred
is src_eqv_amt_s.
At the current exchange rate of
fx_mult/fx_curr1/fx_rate/fx_curr2,
the src_eqv_amt_s is
equivalent to dst_eqv_amt_s.
Shall I go ahead?
    YES           NO           EXIT
```

The data elements for the source currency are the same as described above except for the following:

| Data Name | Comments |
|---|---|
| dst_eqv_amt_s | Format Destination Equivalent Transaction Amount with currency descriptor based on Currency Code of the destination account obtained from the system (Step 708). |

Once the summer of the transaction has been displayed, and approved by the customer, the process continues with the main routine shown in FIG. 6. If not approved, a message is displayed indicating that the transfer has been cancelled and the customer is provided with the option of performing another transaction (Steps 704, 706).

It is noted that the several different options for the summary of the fee amount in either source or destination currency format ensures compliance with various regulatory requirements. Specifically, this approach assists the customer in understanding, for example, the rate, the exchange rate and any applicable fees. At several points, the customer is given the option of terminating the transaction.

As shown in FIG. 6 the process resumes at Step 230. In order to provide additional safeguards, the customer is requested to re-enter his or her PIN. This ensures that the same customer who initiated the transaction is still operating the CAT. If the PIN entered by the customer is determined to be correct, then the process continues at Step 232.

At Step 232, the CAT sends a message to both the source host and the destination host which implements the transfer. Specifically, once the message has been sent, the CAT checks for the response to this message at Step 234 shown in detail in FIGS. 13-1 and 13-2.

As shown in FIGS. 13-1 and 13-2, at Step 802 the CAT displays a message to the customer indicating that it is waiting for a response from the FEP. The response is examined at Step 804. If the response returned from the FEP is an Action Code equal to zero, this indicates that the system approves the transaction before proceeding. At this point, if an Action Code having a zero value is returned the system first verifies that all the required data elements have been returned from the FEP at Step 806. The CAT then determines whether all the data formats are in proper form at Step 808. If either data elements are found to be missing (Step 810) or data formats are found to be incorrect (Step 812) a reversal reason code is set to an appropriate value, and the process continues with Step 850 (FIG. 13-2). If both these conditions are met, the process continues as shown in FIG. 6.

As shown in Step 850, a "Send Transfer Authorization Reversal" message is sent to the FEP. This enables the CAT to indicate to the host system that an error has occurred and to cancel the requested transaction. An application error screen is displayed to the customer at Step 852 and the session is terminated (Step 854) with the customer's card being returned to the customer. This enables the CAT to provide an error verification procedure.

If at Step 804 (FIG. 13-1) a non-zero Action Code value is provided, various procedures occur depending on the particular value of the Action Code. These correspond to various conditions which prevent the transaction from proceeding as requested by the customer. The following describes, merely by way of example, various error codes which can be detected in a preferred embodiment of the invention.

For example, if an Action Code equal to 51 is returned by the FEP, it is required that the customer's PIN be re-entered at Step 814. The response from the FEP is then re-examined at Step 804.

An Action Code of 71 in this example means that there are insufficient funds in the source account to cover the transaction. In such a case, the system indicates that there are insufficient funds to cover the transaction. For example, the system displays the requested amount with or without the customer's account balance by first checking the system configuration in this regard at Step 814 and then displaying an appropriate message at either Step 816 or Step 818. In this example, a screen such as the following is displayed if the system is configured to display the customer's account balance (Step 816):

---
I'm sorry. I can't do that right now.
You have bal_s available in your
acct_desc9
and you would like to transfer
txn_amt_s.
May I help you with something else?
    YES                NO
                                      EXIT

---

This screen displays the value of a data element "bal_s" which corresponds to the available balance of the source account available to the customer. Data elements for the account description text for the account "acct_desc9" and for the transaction amount "txn_amt_s" are also displayed. If the system is configured not to show the customer's account balance, a similar message is displayed at Step 818 without the data elements "bal_s." The customer is given the option of requesting another transaction.

In this example, an Action Code of 72 means that the customer has exceeded a daily product limit. An appropriate message is displayed to the customer alerting the customer of this situation. Depending on the elements returned in the response message checked at Step 822, this display may either include the current limit, the current limit amount and the limit period (Step 820), or just simply indicate that the limit amount has been exceeded (Step 824). An example of the former case is shown below:

---
I'm sorry. I can't do that right now.
That would put you over the limit of
lmt_amt_s per lmt_period_txt for your acct_desc11.
May I help you with something else?
    YES                NO
                                      EXIT

---

As indicated above, such a screen includes the following data elements: a "lmt_amt_s" data element corresponding to the period of time to which the transfer limit applies (for example, a day, a week, or a month); and a "acct_decll" data element which corresponds to text that describes the customer's account.

An Action Code equal to 73 indicates that the requested transfer would bring the customer's account below a minimum level. For example, many countries require by law that a minimum balance be maintained in a particular account. This code is used to indicate that the transaction will result in the account falling below this minimal level. An appropriate display is then provided to the customer at Step 826 indicating this error.

An Action Code of 130 indicates that the requested transaction would exceed a daily limit. For example, some countries limit the amount of transfers that are permitted in a particular period of time (for example, a day, or a week). Such a condition is indicated in this example at Step 832 by a screen such as the one which follows:

---
I'm sorry. That would exceed the limit for transfers
to others.
The remaining amount you can
transfer here lim_period_txt is
lim_amt_rem_s.
To transfer more, or for more information, please go
to a branch.
May I help you with something else?
    YES                NO
                                    EXIT

---

In this message, a first data element "lim_period-txt" indicates the limit period. For example the following text may be inserted: "today," "this week," or "this month." A second data element indicates the remaining amount that can be transferred without exceeding the pre-established limit.

In this example, an Action Code of 134 means that the customer has requested a transfer from a blocked account. A message is then displayed to the customer at Step 830 indicating that the account has been blocked and the customer is given the option of attempting to proceed with another transaction.

An Action Code of 137 means that the customer has attempted to effect a transfer to the same account as the source account. In such a case, a message is provided at Step 832 indicating that this transaction cannot proceed and the customer is given the option of requesting another transaction (Step 868).

As shown in FIG. 13-2, an Action Code of 651 means that a check of the recipient's name against the Local and U.S. Sanctions lists (countries or individuals with which the banking institution may be prohibited from dealing) was positive. This prevents the customer from proceeding with the requested transfer. An Action Code of 602 means that the balance of the source account at the time the transfer was requested was already below a minimum amount. This prevents the customer from proceeding with the requested transfer. An Action Code of 601 means that the transfer amount is less than the minimum deposit amount for the destination account. An Action Code of 603 means that if the transfer were implemented, the balance of the destination account would be too high. In either case, a message is displayed (Steps 834 or 836 respectively) indicating that the system cannot make the transfer to the destination account.

An Action Code of 05 transactions involves to transactions involving Belgium. In Belgium, it is required that a special security device, called a SCM device, be utilized. An Action Code of 05 indicates that a particular type of SCM error has occurred. In such a case, the CAT sets a parameter or code appropriately at Step 838 and then at Step 850 sends an authorization reversal message to the system indicating that an error has been detected. The customer session is then terminated at Step 854.

An Action Code of 04 indicates that a communication problem has occurred. This means that a request was sent out and a predetermined time-out period had elapsed without a response coming back from the FEP. In such a case, an authorization reversal message is sent to the FEP at Step 858 an error message is displayed to the customer at Step 864. The session is then terminated (Step 854). An Action Code of 29 is another example of a detected problem related to an SCM device. More specifically, while an Action Code of 05 indicates that there is a problem related to a communication from the CAT to the host, an Action Code of 29 indicates a problem with the response from the host back to the CAT. In the latter case, a message is sent to reverse the transaction at Step 862.

Other Action Codes can be handled in a similar manner (Step 866).

If a zero Action Code had been detected at Step 804, the process proceeds as shown at Step 236 of FIG. 6. As shown therein, a counter is incremented indicating that one transfer has successfully been completed. At this point, the CAT indicates that the transfer has been made and may optionally indicate the customer's account balances after the transfer (Steps 238, 240, 242). If balances are displayed, a screen such as follows is displayed:

```
        Okay. I just transferred
        txn_amt_s.
        From:    src_prod_3/src_acct_no
                    bal_txt
        src_bal1/src_bal1_txt
        src_bal2/src_bal2_txt
        To:      recip_name_25
        May I help you with something else?
   YES                  NO
                                   EXIT
```

In this example, the following data elements are utilized:

| Data Name | Comments |
| --- | --- |
| txn_amt_s | Displays Transaction Amount. |
| src_prod3 | Displays account description text_a based on the source Product Type selected. |
| src_acct_no | Print Source Account Number only when there is more than one account of the source account Product Type |
| bal_txt | If more than one balance is displayed for the source account, displays "New balances:". Otherwise, displays "New balances:". |
| src_bal1 | Formats the balance with currency descriptor based on Currency Code in the Source Account for the Product Class selected. |
| src_bal1_txt | Displays Screen Text based on the Balance Type and Product Class selected. |
| src_bal2_txt | Displays Screen Text based on the Balance Type and Product Class selected. |
| src_bal2_txt | Displays Screen Text based on the Balance Type and Product Class selected. |
| recip_name-25 | Displays Recipient Name entered by the customer. |

As shown in FIG. 6, the transfer process is then completed. The customer may then proceed with other transactions (Step 244) in accordance with methods known in the art.

If the transaction just completed were an Inter-Bank External Transfer, the funds would now be held in the transfer holding account 34 on FIG. 1. The destination (remote) FEP 30 will now relay the funds to the destination's local clearing system 36, and from there will be deposited into the final destination account in the destination external banking system 38.

Figure 15:
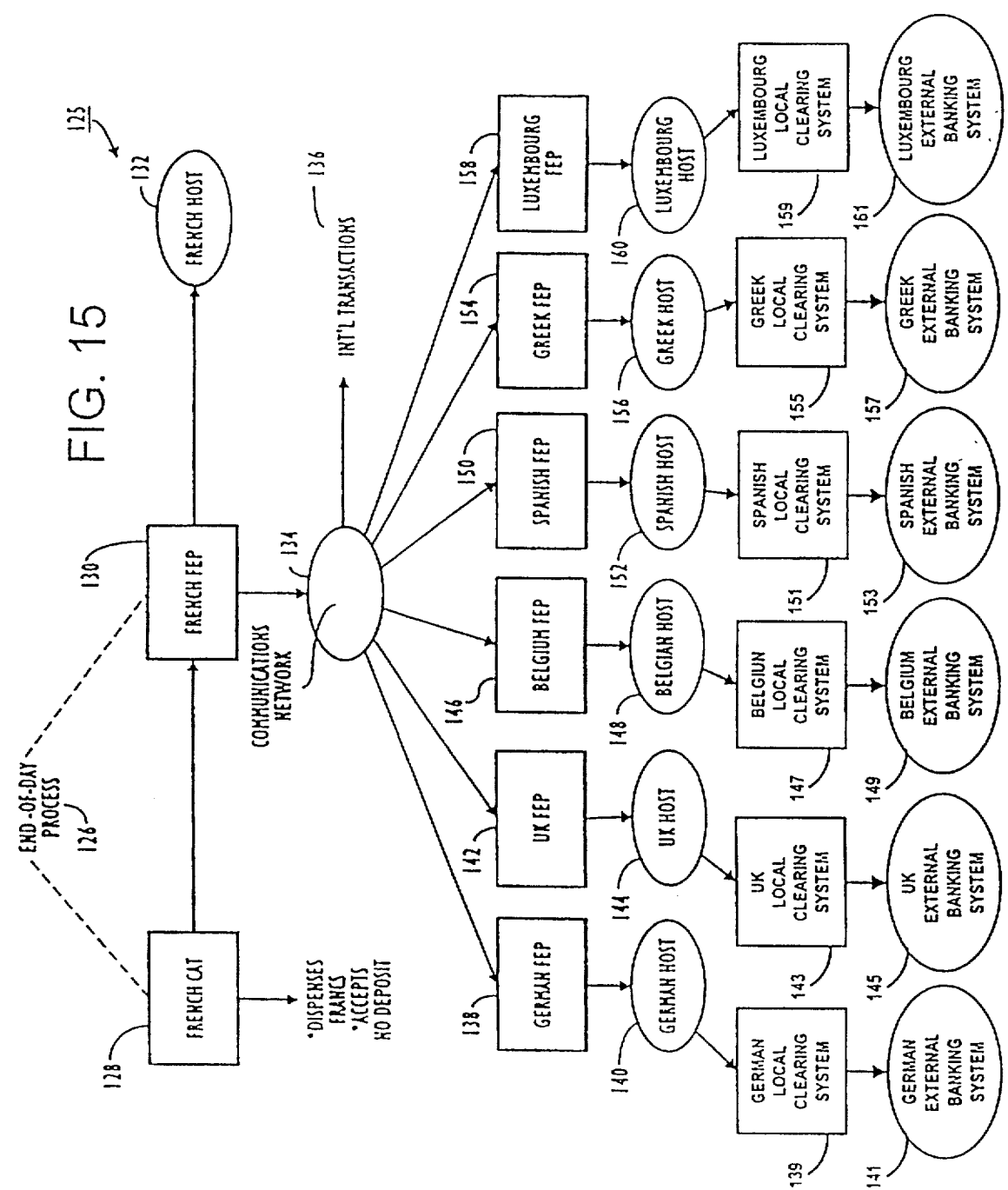
FIG. 15 is a block diagram showing the system for implementing regional transfers in accordance with an embodiment of the present invention.

FIG. 15 illustrates a system 125 for implementing regional transfers in accordance with the process described above. In this example, a CAT 128 in France is connected to a French FEP 130 which in turn is connected to a French host system 132 associated with a French banking institution.

In this example, the user of the French CAT 128 can perform regional transfers as described above through a communications network 134. This communications network 134 links the French FEP 130 with several others FEPs in the same region, for example a German FEP 138, a UK FEP 142, a Belgian FEP 146, a Spanish FEP 150, a Greek FEP 154, and a Luxembourg FEP 158 (140, 144, 148, 152, 156, 160). Each of these FEPs is connected to a indicated at 136 in FIG. 15, the communications system also permits access to other regional systems in order to provide limited international transactions as referred to above in FIG. 4.

In accordance with the invention, this system enables a customer in France to make transfers to another account with a financial institution running in another country. For example, the French customer might request a regional transfer from a checking account with a French bank associated with French host 132 to a Spanish bank associated with Spanish host 152. The French CAT 128 would then implement the process described above with reference to FIGS. 6 to 14. Specifically, after proceeding through the identification and validation procedure described above, the customer would select a recipient business and provide a recipient name in Spain, and an account number for an account in Spain. In response to the French CAT's request, the communications system 134 would obtain and provide to the French FEP 130 the current exchange rate for exchanging French francs for Spanish pesetas, and any applicable fees. This information would be provided in either francs or pesetas at the customers choosing. Once the customer has viewed the exchange rate and approved the transaction, the customer then requests that the transfer be implemented.

At this point, a transfer request message is sent from the French CAT 128 to the French FEP 130. The French 130 then contacts the French host 132 in order to debit the customer's French account. After the French account is debited, the French FEP 130 sends a message to the communications systems which is passed along to the Spanish FEP 150. The Spanish FEP 150 receives this message and provides it to the Spanish host 152. In response, the Spanish host 152 implements the credit to the destination account.

In this example, the Spanish host 152 provides a response to the Spanish FEP 150 which is transmitted through the communications system 134 to the FEP 130. The French FEP 130 then sends the response to the French CAT 128. Next, the French CAT 128 checks this response in correspondence with Step 234 of FIG. 6 (described in detail in reference to FIG. 13). The French CAT 128 then displays a final message indicating whether or not the requested transfer has been implemented.

Additionally, FIG. 15 illustrates a system 125 for implementing Inter-Bank External Transfers in accordance with the process described above. In this example, a CAT 128 in France is connected to a French FEP 130 which in turn is connected to a French host system 132 associated with a French banking institution.

In this example, the user of the French CAT 128 can perform Inter-Bank external transfers as described above through a communications network 134. This communications network 134 links the French FEP 130 with several other FEPs in the same region, for example a German FEP 138, UK FEP 142, a Belgian FEP 146, a Spanish FEP 150, a Greek FEP 154, and a Luxembourg FEP 158 (140, 144, 148, 152, 156, 160). Each of these FEPs is connected to a host system associated with a particular banking institution. Each FEP is also connected to the location's Local Clearing System (139, 143, 147, 151, 155, 159) which is then providing a transfer connection to an External Banking System (141, 145, 149, 153, 157, 161).

In accordance with the invention, this system enables a customer in France to make transfers to another account with an external financial institution running in another country. For example, the French customer might request a regional transfer from a checking account with a French bank associated with French host 132 to an external Spanish bank 153 connected with the Spanish Local Clearing System 151. The French CAT 128 would ten implement the process described above with reference to FIGS. 6 to 14. Specifically, after proceeding through the identification and validation procedure described above, the customer would select a recipient business and provide a recipient name in Spain, and an account number for an account in Spain. In response to the French CAT's request, the communications system 134 would obtain and provide to the French francs for Spanish pesetas, and any applicable fees. This information would be provided in the destination currency of pesetas for us in an external transfer. Once the customer has viewed the exchange rate and approved the transaction, the customer then requests that the transfer be implemented.

At this point, a transfer request message is sent from the French CAT 128 to the French FEP 130. The French 130 then contacts the French host 132 in order to debit the customer's French account. After the French account is debited, the French FEP 130 sends a message to the communications systems which is passed along to the Spanish FEP 150. The Spanish FEP 150 receives this message and provides it to the Spanish host 152. In response, the Spanish host 152 implements the credit to a transfer holding account.

In this example, the Spanish host 152 provides a response to the Spanish FEP 150 which is transmitted through the communications system 134 to the French FEP 130. The French FEP 130 then sends the response to the French CAT 128. Next, the French CAT 128 checks this response in correspondence with Step 234 of FIG. 6 (described in detail in reference to FIG. 13). The French CAT 128 then displays a final message indicating whether or not the requested transfer has been implemented.

To complete the Inter-Bank External Transfer, the Spanish FEP 150 communicates the transaction's information about the amount, source account, destination account, and any attached messages to the Spanish Local Clearing System 151. The local clearing system will process the requested transfer of funds between banking systems and post a credit of the transfer amount to the destination account within the Spanish External Banking System 153.

Subsequent to this procedure, the communications network is used to automatically perform a settlement procedure between the French host 132 and the Spanish host 152 for the above-described transaction and others which may have occurred. This settlement procedure occurs on a periodic basis, for example, a daily basis, in accordance with techniques known in the art. Similarly, authorized personnel perform an end-of-the-day process 126 to reconcile transactions implemented with the French CAT 128 with the French host 132 through French FEP 130.

Accordingly, in this example, the communications network 134 performs various functions. In addition to participating in the aforementioned settlement function, it provides a central communications means for exchanging electronic messages among the various FEPs. It also maintains a database of current exchange rates which are made available to the FEPs. Based on the exchange rate information provided by the communications network, the front end and host systems perform the necessary calculation to inform the customer of the applicable fees and to debit the source account and to credit the destination account.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

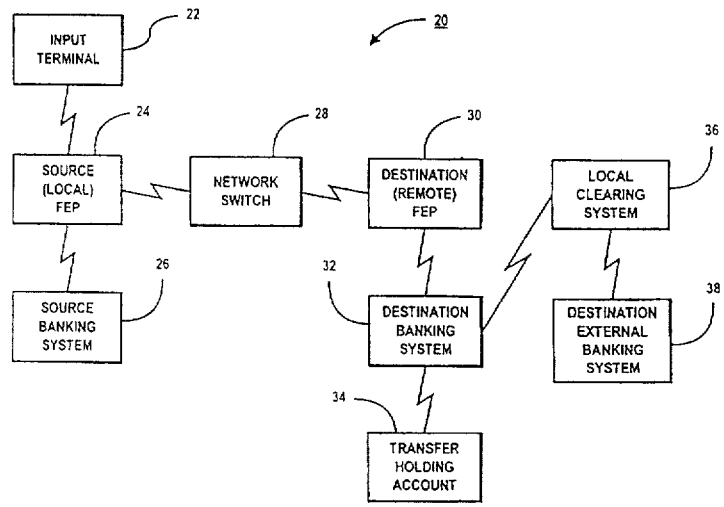

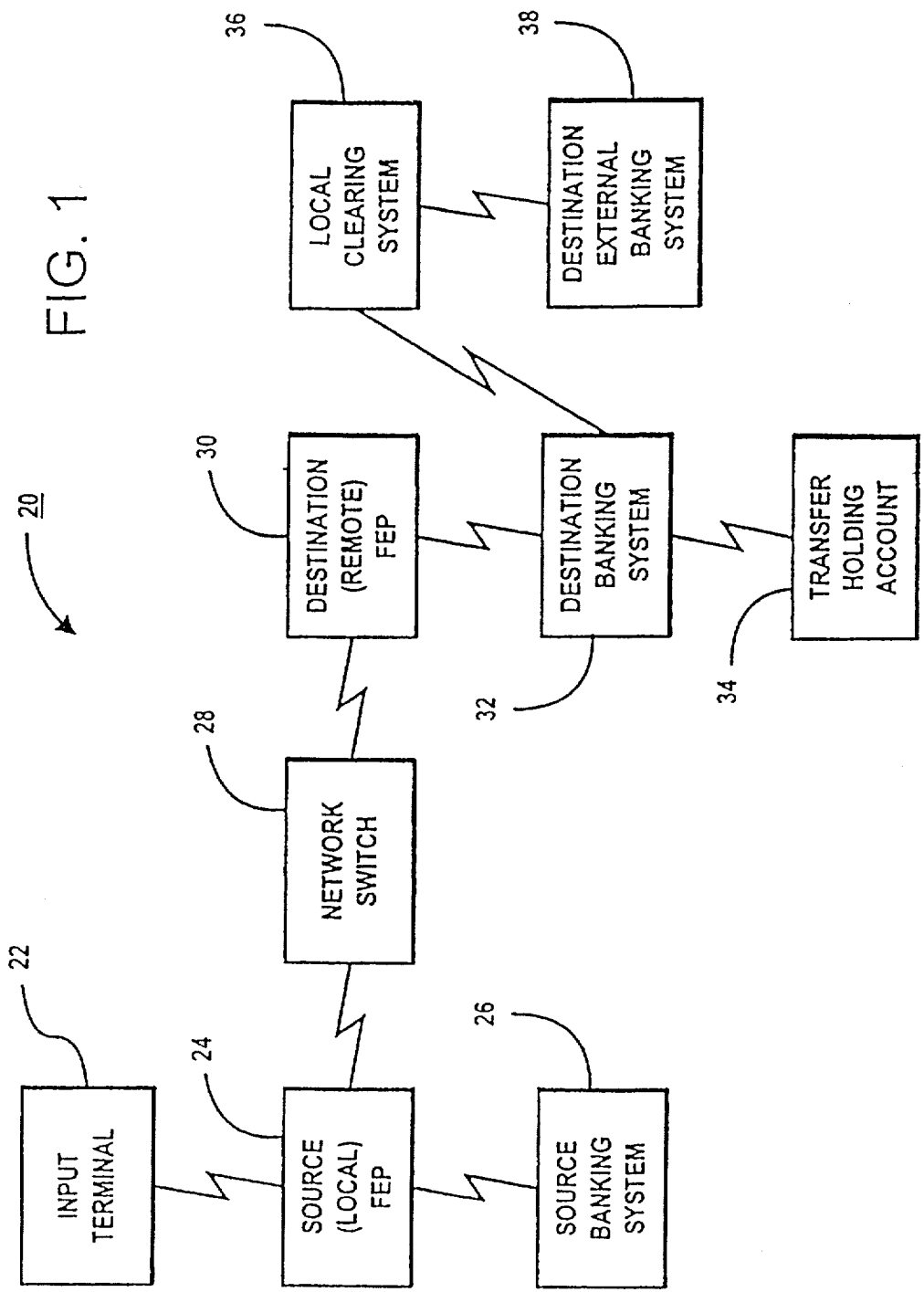

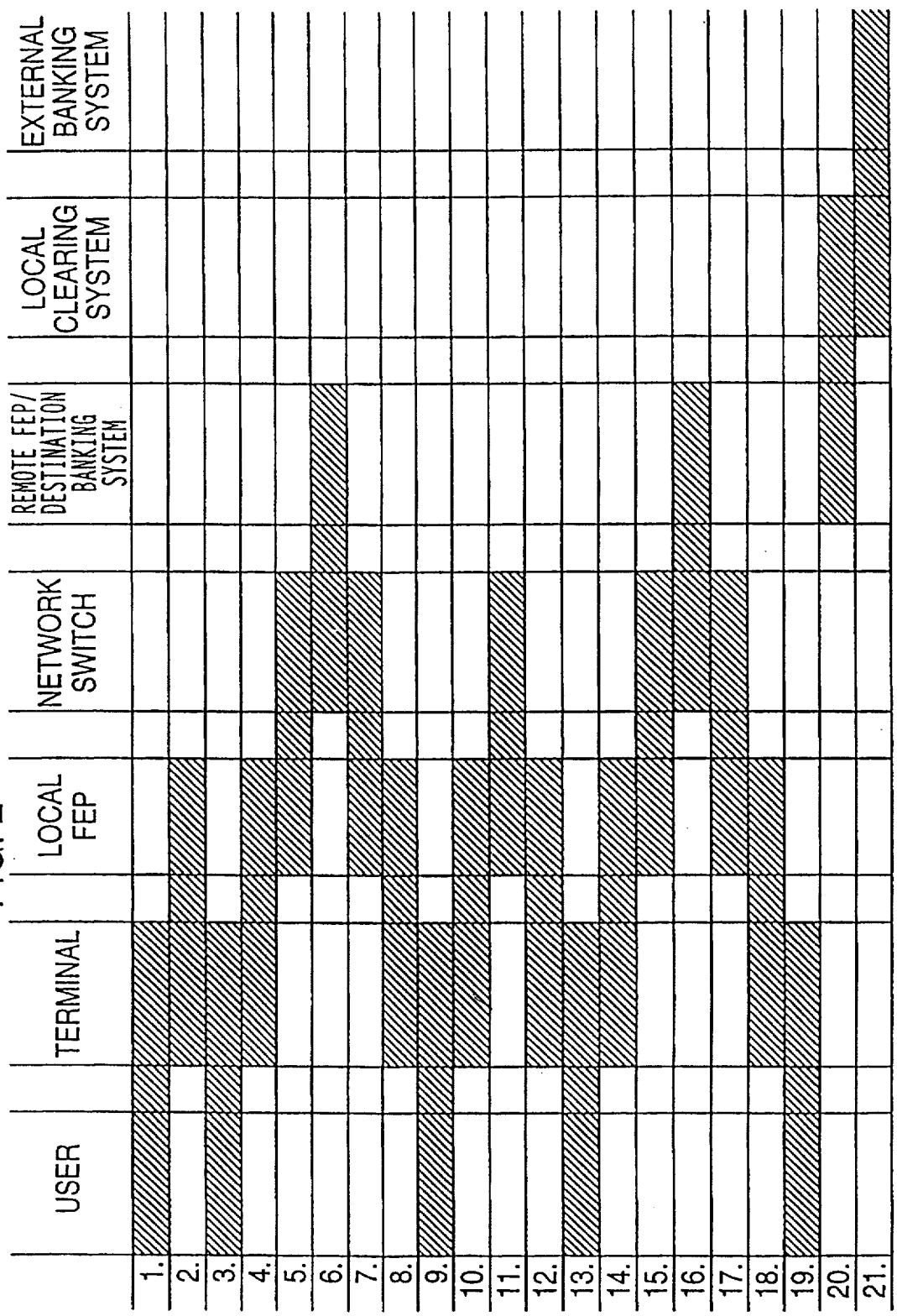

What is claimed is:

1. A process for transferring funds from a source account at a first financial institution to a destination account at a second financial institution through a communications network, comprising the steps of:

receiving first data input with an input terminal and matching said first data with a record of a source account, the record being stored in a first host system and including an indication of a type of currency maintained in the source account;

receiving second data provided with the input terminal, the second data indicating a recipient account and verifying the validity of the recipient account;

receiving third data provided with the input terminal, the third data corresponding to a requested amount to be transferred from the source account to the destination account, the requested amount being input in a selected format corresponding to the type of currency maintained in one of the source account and the destination account; and subsequent to receiving authorization to implement the requested transfer, depositing the funds to be transferred into a transfer holding account which is then processed through a clearing system local to said second financial institution and then depositing said funds from said holding account to said destination account in said second financial institution.

2. The process according to claim 1, further comprising the step of determining any fee amounts required to process the requested transfer, the fee amounts including a first fee charged by a first financial institution maintaining the source account and a second fee charged by a second financial institution maintaining the destination account.

3. The process according to claim 1, wherein the input terminal includes a card reader for reading encoded data corresponding at least in part to the first data.

4. The process according to claim 3, further comprising a step of receiving an identification code entered through the input terminal and validating the identification code based on the record of the source account.

5. The process according to claim 1, wherein said input terminal is an automated teller machine.

6. The process according to claim 1, wherein currency of the source account differs from the currency of the destination account, the process including the step of determining an equivalent value of the requested amount based on a substantially current exchange rate between the currency of the source account and the currency of the destination account.

7. The process according to claim 1, further comprising the step of displaying a description of the currency of the source account and the currency of the destination account.

8. The process according to claim 7, wherein the input terminal is an ATM that includes a card reader for reading encoded data corresponding at least in part to the first data, the encoded data including a number indicative of the financial institution issuing a card that is read by the card reader, wherein the currency of the source account is obtained by referencing said encoded data with a recorded table of financial institutions.

9. The process according to claim 1, wherein the input terminal comprises a personal computer.

10. The process according to claim 1, wherein the input terminal comprises a home banking telephone.

11. In a system for performing money transfers from a source account at a first financial institution to a destination account at a second financial institution comprising an input terminal having input means and display means, a first host system which is in communication with said input terminal and which services a source account affiliated with said first financial institution, and a second host system coupled to said first host system with a communications network said second host system servicing a destination account affiliated with said second financial institution, wherein:

first data is provided with said input means and is matched with a record of the source account stored in the first host system, the record including an indication of a type of currency maintained in the source account;

second data is provided with the input means which is indicative of the recipient account and verification of the validity of the recipient account;

third data is provided with the input means which corresponds to a requested amount to be transferred from the source account to the destination account, the requested amount being input in a selected format corresponding to the type of currency maintained in one of the source account and the destination account; and an electronic message is transmitted to the second host system authorizing a credit to the destination account in the requested amount and the first host account debits the source account by the total debit amount;

said funds are first transferred to a transfer holding account and then processed through a clearing system local to said second financial institution; and said funds are then transferred from said holding account to said destination account affiliated with said second financial institution.

12. The system according to claim 11, wherein any fee amounts required to process the requested transfer are calculated, the fee amounts including a first fee charged by said first financial institution maintaining the source account and a second fee charged by said second financial institution maintaining the destination account, wherein the total debit amount includes the requested amount and any amounts based on the first fee and the second fee.

13. The system according to claim 11, wherein the input terminal includes a card reader for reading encoded data corresponding at least in part to the first data.

14. The system according to claim 13, wherein an identification code entered with the input means is received and validated based on the record of the source account.

15. The system according to claim 11, wherein said input terminal is an automated teller machine.

16. The system according to claim 11, wherein the currency of the source account differs from the currency of the destination account, and wherein an equivalent value of the requested amount is determined based on a substantially current exchange rate between the currency of the source account and the currency of the destination account.

17. The system according to claim 11, wherein a description of the currency of the source account and the currency of the destination account are displayed with the display means.

18. The system according to claim 17, wherein the input terminal is an ATM that includes a card reader for reading encoded data corresponding at least in part to the first data, the encoded data including a number indicative of the financial institution issuing a card that is read by the card reader, wherein the currency of the source account is obtained by referencing said encoded data with a recorded table of financial institutions.

19. The process according to claim 11, wherein the input terminal comprises a personal computer.

20. The process according to claim 11, wherein the input terminal comprises a home banking telephone.

* * * * *

UNITED STATES PATENT AND TRADEMARK OFFICE
CERTIFICATE OF CORRECTION

PATENT NO. : 5,825,003
DATED : October 20, 1998
INVENTOR(S) : Horton Jennings, et. al.

It is certified that error appears in the above-identified patent and that said Letters Patent is hereby corrected as shown below:

The Title page should be deleted and substitute therefor the attached title page.

Drawings:

Delete Figures 1, 2, 5, 6, 9, 13-2, and 15, and substitute therefor the Drawing Sheets consisting of Figures 1, 2, 5, 6, 9, 13-2, and 15, as shown on the attached pages.

Signed and Sealed this

Twenty-eighth Day of September, 1999

*Attest:*

Q. TODD DICKINSON

*Attesting Officer*     *Acting Commissioner of Patents and Trademarks*

United States Patent [19]
Jennings et al.

[11] Patent Number: 5,825,003
[45] Date of Patent: Oct. 20, 1998

[54] CUSTOMER-DIRECTED, AUTOMATED PROCESS FOR TRANSFERRING FUNDS BETWEEN ACCOUNTS USING A HOLDING ACCOUNT AND LOCAL PROCESSING

[75] Inventors: Horton Jennings, Chicago; Nigel Pinnell, Highland Park, both of Ill.; Khanh Do, Rancho Palos Verdes, Calif.; Virendrakumar Shah, La Palma, Calif.; Marjorie Profumo, Santa Monica, Calif.; John Downing, Old Windsor, England; Neil Goodhand, Bracknell, England; Marion Maino, Southold; Michael H. Thompson, Centereach, both of N.Y.

[73] Assignee: Citicorp Development Center, Los Angeles, Calif.

[21] Appl. No.: 795,355

[22] Filed: Feb. 4, 1997

Related U.S. Application Data

[63] Continuation-in-part of Ser. No. 505,886, Jul. 24, 1995, Pat. No. 5,659,165.

[51] Int. Cl.⁶ .................................................. G06F 17/60
[52] U.S. Cl. ........................... 235/379; 235/381; 902/5; 902/32
[58] Field of Search .................... 235/379, 375, 235/382, 380, 381; 902/4, 5, 14, 20, 24, 32; 395/200.01, 200.02, 200.03, 200.1; 705/42, 44

[56] References Cited

U.S. PATENT DOCUMENTS

| | | | |
|---|---|---|---|
| 3,826,344 | 7/1974 | Wahlberg | 235/381 X |
| 4,341,951 | 7/1982 | Benton | 235/379 |
| 4,498,000 | 2/1985 | Decavele et al. | 235/380 |
| 4,529,870 | 7/1985 | Chaum | 235/380 |
| 4,707,592 | 11/1987 | Ware | 235/379 |
| 4,766,293 | 8/1988 | Boston | 235/379 |
| 4,773,001 | 9/1988 | Blair et al. | 364/200 |
| 4,926,368 | 5/1990 | Morita et al. | 364/408 X |
| 5,012,076 | 4/1991 | Yoshida | 235/379 |
| 5,025,373 | 6/1991 | Keyser, Jr. et al. | 235/379 X |
| 5,326,960 | 7/1994 | Tannenbaum | 235/379 |
| 5,350,906 | 9/1994 | Brody et al. | 235/379 |
| 5,367,561 | 11/1994 | Adler et al. | 235/379 |
| 5,424,938 | 6/1995 | Wagner et al. | 364/408 |
| 5,440,634 | 8/1995 | Jones et al. | 300/24 |
| 5,448,043 | 9/1995 | Nakano et al. | 235/379 |
| 5,455,407 | 10/1995 | Rosen | 235/380 |
| 5,457,305 | 10/1995 | Akel et al. | 235/379 |
| 5,524,073 | 6/1996 | Stambler | 380/24 |

*Primary Examiner*—Donald T. Hajec
*Assistant Examiner*—Michael G. Lee
*Attorney, Agent, or Firm*—George T. Marcou; Kilpatrick Stockton LLP

[57] ABSTRACT

A system and method for allowing funds to be transferred instantly to an account so that the funds are available to the beneficiary at the time they are sent, based on customer information which can be automatically accessed by the system, rather than needing to be manually entered. Further, the system automatically computes the appropriate exchange rate and any fees to be charged to the account and displays them to the user so that the user may authorize or cancel the transaction. They system also analyzes the parameters of the transfer to assure that the transfer conforms with pertinent government regulations. The system also enables the user to quantify the amount to be transferred in the currency of the originating account or the currency of the receiving account, thereby maximizing the flexibility of the system. The system further is designed so that it can be understood and accessed by individuals having no special expertise in computers, wire transfers and the like. Further, the system is provided with various safeguards to assure that only authorized individuals have access to the accounts and the funds and immediately verifies successful completion or failure to the customer.

20 Claims, 18 Drawing Sheets